US012135587B1

(12) United States Patent
Agrawal et al.

(10) Patent No.: US 12,135,587 B1
(45) Date of Patent: Nov. 5, 2024

(54) MANAGING CONSISTENT FINGERPRINT-ON-DISPLAY (FOD) LOCATION ON A ROLLABLE DEVICE HAVING MULTIPLE FOD SENSORS

(71) Applicant: MOTOROLA MOBILITY LLC, Wilmington, DE (US)

(72) Inventors: Amit Kumar Agrawal, Bangalore (IN); Boby Iyer, Elmhurst, IL (US); Matthew Deheck, Grayslake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/357,133

(22) Filed: Jul. 23, 2023

(51) Int. Cl.
*G06F 1/16* (2006.01)
*G06F 3/041* (2006.01)
*G06F 21/32* (2013.01)
*G06V 40/12* (2022.01)
*G06V 40/13* (2022.01)
*G09F 9/30* (2006.01)
*H04M 1/02* (2006.01)

(52) U.S. Cl.
CPC .......... *G06F 1/1652* (2013.01); *G06F 1/1624* (2013.01); *G06F 3/0412* (2013.01); *G06F 21/32* (2013.01); *G06V 40/13* (2022.01); *G06V 40/1365* (2022.01); *G09F 9/301* (2013.01); *H04M 1/0268* (2013.01)

(58) Field of Classification Search
CPC .......... G06F 1/16; G06F 1/1613–1624; G06V 40/12–1394
See application file for complete search history.

(56) References Cited

U.S. PATENT DOCUMENTS

| 11,009,912 | B2 * | 5/2021 | Kim | G09G 3/035 |
| 11,029,732 | B2 * | 6/2021 | Ahn | G09F 9/301 |
| 11,877,858 | B2 * | 1/2024 | Kang | A61B 5/743 |
| 2020/0209923 | A1 * | 7/2020 | Ahn | G06F 3/0416 |
| 2020/0225848 | A1 * | 7/2020 | Yoon | G06F 3/0481 |
| 2021/0072796 | A1 * | 3/2021 | Kim | G09G 3/035 |
| 2021/0326569 | A1 * | 10/2021 | Song | G06F 1/1652 |

(Continued)

FOREIGN PATENT DOCUMENTS

EP 4280027 A1 * 11/2023
WO WO-2023191320 A1 * 10/2023

*Primary Examiner* — Patrick F Marinelli
(74) *Attorney, Agent, or Firm* — Isidore PLLC

(57) ABSTRACT

An electronic device, method, and computer program product provide a predictable external finger area on a "rollable display device" for fingerprint authentication that is available at least in both a fully retracted position and fully extended position. The electronic device selectively operates a translation mechanism to slide a blade assembly relative to a device housing between the fully retracted position and the fully extended position. The blade assembly has a blade slidably coupled to a device housing and having a flexible display attached to the blade. The blade assembly has first and second fingerprint-on-display (FOD) areas that are optically transmissive, enabling light to pass through the blade assembly. While retracted, both fingerprint scanners are aligned FOD areas for use while looking at either the front or back portions of the flexible display. While extended, the front fingerprint scanner is aligned with the second FOD area while viewing the flexible display.

20 Claims, 22 Drawing Sheets

(56) References Cited

U.S. PATENT DOCUMENTS

2023/0028294 A1\* 1/2023 Kim .................. G06V 40/1318
2023/0097982 A1\* 3/2023 Kim ....................... G06F 21/44
                                                            455/575.4

\* cited by examiner

MANAGING CONSISTENT FINGERPRINT-ON-DISPLAY (FOD) LOCATION ON A ROLLABLE DEVICE HAVING MULTIPLE FOD SENSORS

BACKGROUND

1. Technical Field

The present disclosure relates generally to communication devices having a sliding or translating form factor, and in particular to communication devices that have a single housing and a rollable flexible display that slides or translates.

2. Description of the Related Art

Portable electronic communication devices, particularly smartphones, have become ubiquitous. People all over the world use such devices to stay connected. These devices have been designed in various mechanical configurations. A first configuration, known as a "candy bar", is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where two different device housings slide, with one device housing sliding relative to the other.

Some consumers prefer candy bar devices, while others prefer clamshell devices. Irrespective of the geometric form factor of the device, device users generally appreciate and/or prefer devices with a larger display surface area. The size of the device's display(s) is conventionally limited to the dimension of the device housing. Newer design forms provide mechanical configurations that change the size and/or location of the display relative to the housing. Incorporating fixed location features, such as biometric sensors, in these newer device configurations creates a challenge.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
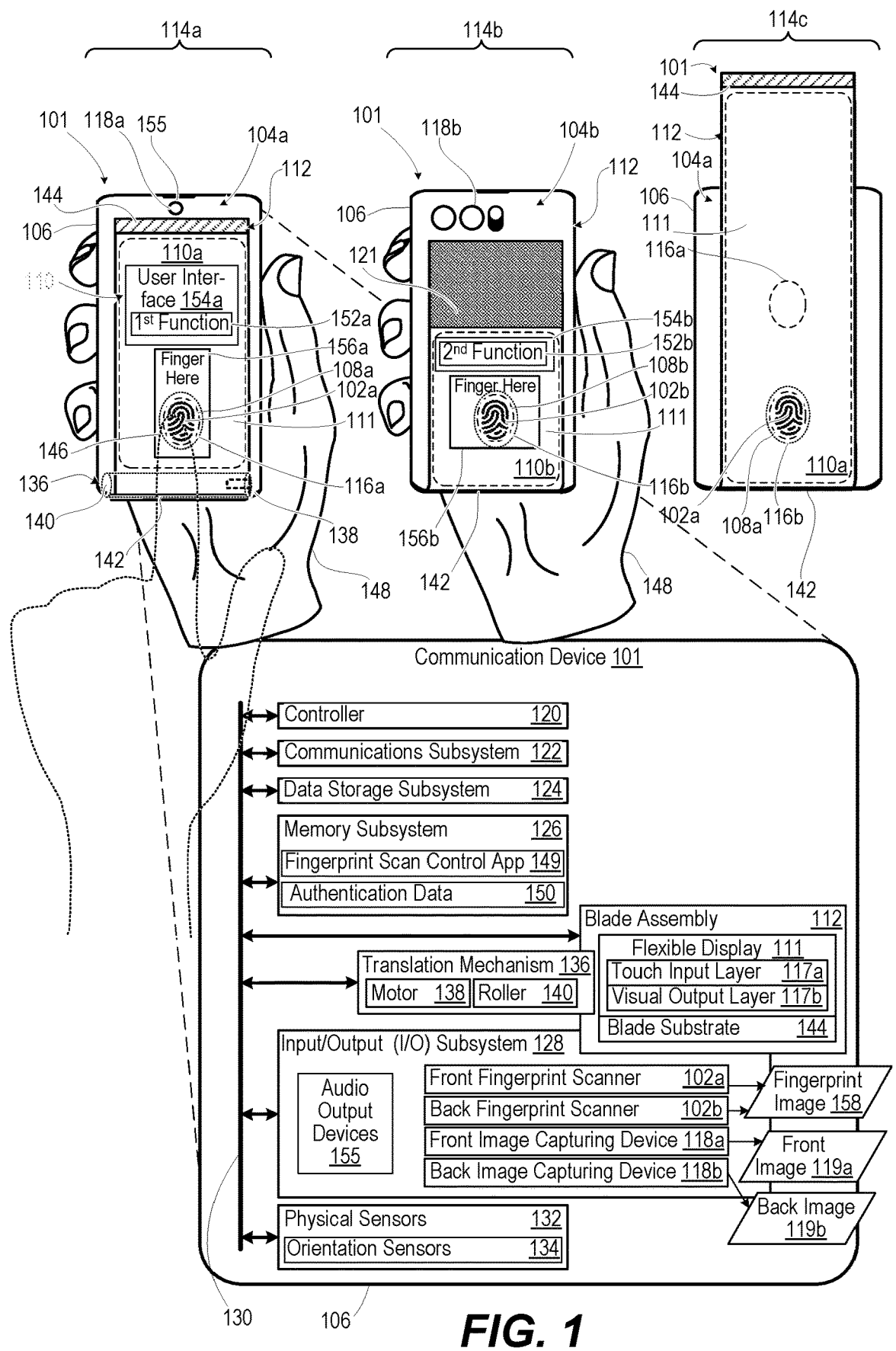
FIG. 1 presents a simplified functional block diagram of a communication device, shown with front and back views of a blade assembly for a rollable display in a retracted position and a front view of the rollable display in a fully extended position, while capturing a fingerprint of a user for authentication, according to one or more embodiments.

According to aspects of the present disclosure, an electronic device, a method, and a computer program product provide a "rollable display device" that has a flexible display which retracts to provide a small form factor for stowing or carrying and is extendable to a larger display size. When authentication is required, the electronic device supports capturing a fingerprint at fixed finger-on-display areas on the display, at least one of which is aligned, while a blade assembly that supports the display is in either a fully extended position or a fully retracted position, to an underlying fixed finger-on-display location on a device housing of the electronic device.

In one or more embodiments, the electronic device includes a device housing having a front side and a back side. The electronic device includes a front fingerprint scanner exposed at the front side of the device housing at a front fingerprint scanner location. The electronic device includes a back fingerprint scanner exposed at the back side of the device housing. The electronic device includes a blade assembly having a blade slidably coupled to the device housing and having a flexible display attached to the blade. The blade assembly has first and second fingerprint-on-display areas that are optically transmissive, enabling light from corresponding ones of the front and the back fingerprint scanner to pass through the blade assembly. The electronic device includes a translation mechanism operable to slide the blade assembly relative to the device housing between a fully retracted position and a fully extended position. In the fully retracted position, the first and the second fingerprint-on-display areas are respectively positioned above the front fingerprint scanner and the back fingerprint scanner. In one or more embodiments, in the fully extended position, the second fingerprint-on-display area is aligned with the front fingerprint scanner. In one or more embodiments, authenticating the fingerprint may include attempting to match upright and upside-down versions of a captured fingerprint to authentication data for an authorized user.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic device, implemented as communication device 101 than can be one of a host of different types of devices, including but not limited to, a mobile cellular phone, satellite phone, or smart phone, or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Communication device 101 has front fingerprint scanner 102a exposed on front side 104a of device housing 106 at fixed front finger-on-display (FOD) location 108a. Communication device 101 has back fingerprint scanner 102b exposed on back side 104b of device housing 106 at fixed back FOD location 108b. In a right side up position or upright orientation, fixed front and back FOD locations 108a-108b are at a lower portion of device housing 106. Communication device 101 includes front display 110a positioned on front side 104a of device housing 106 and back display 110b positioned on back side 104b of device housing 106. In one or more embodiments, front and back displays 110a-110b are portions of flexible display 111 incorporated in blade assembly 112 that is received on device housing 106 to provide a rollable or extendable display. At 114a, a front view of communication device 101 is depicted with blade assembly 112 in a retracted position and having first FOD area 116a covering front fingerprint scanner 102a. First FOD area 116a of blade assembly 112 is optically transmissive, enabling light from front fingerprint scanner 102a to pass through blade assembly 112 while blade assembly 112 is in the retracted position. In one or more embodiments, flexible display 111 includes touch input layer 117a and visual output layer 117b through which light from front fingerprint scanner 102a also passes. The fully retracted position of blade assembly 112 provides a "peek" position to expose front image capturing device(s) 118a that captures front image 119a. At 114b, a back view of communication device 101 is depicted with blade assembly 112 in a retracted position with second FOD area 116b covering back fingerprint scanner 102b. Blade assembly cover 121 is depicted as an upper portion to back display 110b in which display components may be presented. Second FOD area 116b of blade assembly 112 is optically transmissive, enabling light from back fingerprint scanner 102b to pass through blade assembly 112 while blade assembly 112 is in the retracted position. Back image capturing device(s) 118b captures back image 119b. At 114c, a front view of communication device 101 is depicted with blade assembly 112 in an extended position. Most or all of blade assembly 112 is positioned on, and extends beyond, front side 104a of device housing 108, increasing display size of front display 110a. While in the fully extended position, second FOD area 116b of blade assembly 112 aligns with fixed FOD location 108a and front fingerprint scanner 102a.

Communication device 101 may include controller 120, communications subsystem 122, data storage subsystem 124, memory subsystem 126, and input/output (I/O) subsystem 128 (e.g., front and back image capturing devices 118a-118b). To enable management by controller 120, system interlink 130 communicatively connects controller 120 with communications subsystem 122, data storage subsystem 124, memory subsystem 126, and I/O subsystem 128. Communication device 101 may include physical sensors 132 such as orientation sensor 134 that detects whether communication device is upright or upside down. Physical sensors 132 are communicatively connected to controller 120, either directly or indirectly via system interlink 130. System interlink 130 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 130) are illustrated in FIG. 1, it is to be understood that more, fewer, or different interconnections may be present in other embodiments.

According to first aspects of the present disclosure, communication device 101 also includes translation mechanism 136, such as motor 138 that drives roller 140 at bottom edge 142 of device housing 106 engaged to blade substrate 144 and blade assembly 112 and operable to slide blade assembly 112 relative to device housing 106 between a fully retracted position and a fully extended position. In the fully retracted position, first and the second FOD areas 116a-116b are respectively positioned above front and back fingerprint scanners 102a-102b. In one or more embodiments, back fingerprint scanner 102b is aligned with front fingerprint scanner 102a for consistent FOD locations 108a-108b as viewed from either front side 104a or the back side 104b of communication device 101. Controller device 101 selectively activates translation mechanism 136 to position blade assembly 112 to a selected one of the fully retracted position and the fully extended position that aligns second FOD area 116b above front fingerprint scanner 102a. Controller 120 disables activation of first and back fingerprint scanners 102a-102b while translation mechanism 136 is positioning blade assembly 112. In one or more embodiments, controller 120 may trigger translation mechanism 136 to position blade assembly 112 at one or more intermediate positions between the fully retracted position and the fully extended position at which position both first and back fingerprint scanners 102a-102b would remain deactivated.

In one or more embodiments, blade substrate 144 of blade assembly 112 includes sheet metal and front and back FOD areas 116a-116b are each a respective hole in the sheet metal. In one or more embodiments, blade substrate 144 includes an opaque sheet metal and front and back FOD areas 116a-116b includes a respective transmissive area of blade substrate 144 surrounded by opaque sheet material. In response to a requirement to authenticate fingerprint 146 of finger 147 of user 148 while blade assembly 112 is at an intermediate position, controller 120 activates translation mechanism 136 to position blade assembly 112 to a closest one of the fully retracted position and the fully extended position.

In one or more embodiments, in response to determining that a requirement exists for scanning fingerprint 146 of user 148 while blade assembly 112 is in the fully retracted position, communication device 101 triggers at least one of first and back fingerprint scanners 102a-102b to initiate scanning. In an example, communication device 101 triggers both first and back fingerprint scanners 102a-102b to initiate scanning. In response to determining that the requirement exists for scanning fingerprint 146 of user 148 while blade assembly 112 is in the fully extended position, controller 120 triggers only front fingerprint scanner 102a to initiate scanning.

In one or more embodiments, in response to determining that a requirement exists for scanning fingerprint 146 of user 148, controller 120 executes fingerprint scan control application 149 stored in memory subsystem 126. Controller 120 authenticates fingerprint 146 based on authentication data 150 stored in memory subsystem 126. In response to authenticating user 148, controller 120 enables at least one of first function 152a on front user interface 154a presented on front display 110a and second function 152b on back user interface 154b presented on back display 110b. In one or more embodiments, presentation of a respective function may be augmented by audio outputs from audio output device 155.

In one or more embodiments, controller 120 presents either front visual indication 156a via front display 110a or back visual indication 156a via back display 110b of flexible display 111 proximate to a corresponding one of first and back fingerprint scanners 102a-102b that is triggered to initiate scanning. Visual indication(s) 156a-156b prompt user 148 viewing either front display 110a or back display 110b to present fingerprint 146 to an indicated one of first or back fingerprint scanners 102a-102b. Controller 120 receives fingerprint image 158 from the corresponding one of first and back fingerprint scanner 102a-102b. Controller 120 authenticates user 148 in response to identifying that received fingerprint image 158 corresponds to that of an authorized user based on authentication data 150.

In one or more embodiments, in response to determining that a requirement exists for scanning fingerprint 146 of user 148, controller 120 triggers: (i) at least one of front and back fingerprint scanners 102a-102b to initiate scanning while in the fully retracted position; and (ii) only front fingerprint scanner 102a to initiate scanning while in the fully extended position that aligns second FOD area 116b above front fingerprint scanner 102a. Controller 120 obtains biometric feature data from fingerprint 146. Controller 120 authenticates fingerprint 146 by matching one of upright and upside-down versions of the biometric feature data for fingerprint 146 with either an upright or an upside-down version of authentication data 150 stored in memory subsystem 126. Checking for an upside-down fingerprint may be accomplished even when orientation of communication device 101 is not determined or has been determined to be upright. User 148 may still be grasping communication device 101 in an upside-down fashion.

According to aspects of the present disclosure, inconvenience of having to present a fingerprint for authentication is mitigated in at least several scenarios. First, front and back fingerprint scanners 102a-102b are positioned at a lower portion of device housing 106, providing a consistent and easily reachable location, either by the thumb of the grasping hand or a finger of the other hand. By receiving the fingerprint from the side being viewed, user 148 can be visually guided to a corresponding front and back fingerprint scanners 102a-102b. According to additional aspects of the present disclosure, electronic device 101 also facilitates capture of a fingerprint for authentication even when user 148 grasps electronic device 101 in an upside down position, which orients front and back fingerprint scanners 102a-102b at a top portion of device housing 106. Two alternative approaches are disclosed herein for capturing the fingerprint while electronic device 101 is upside down. According to the first aspect as described regarding FIG. 11, electronic device 101 continues to capture the fingerprint from one of front and back fingerprint scanners 102a-102b facing user 148, presumably from a finger on a hand that is not grasping electronic device 101. According to the second aspect, as described regarding FIGS. 13C and 14C and FIG. 17, electronic device captures the fingerprint from one of front and back fingerprint scanners 102a-102b from a finger of the grasping hand opposite to a side facing user 148.

Figure 2:
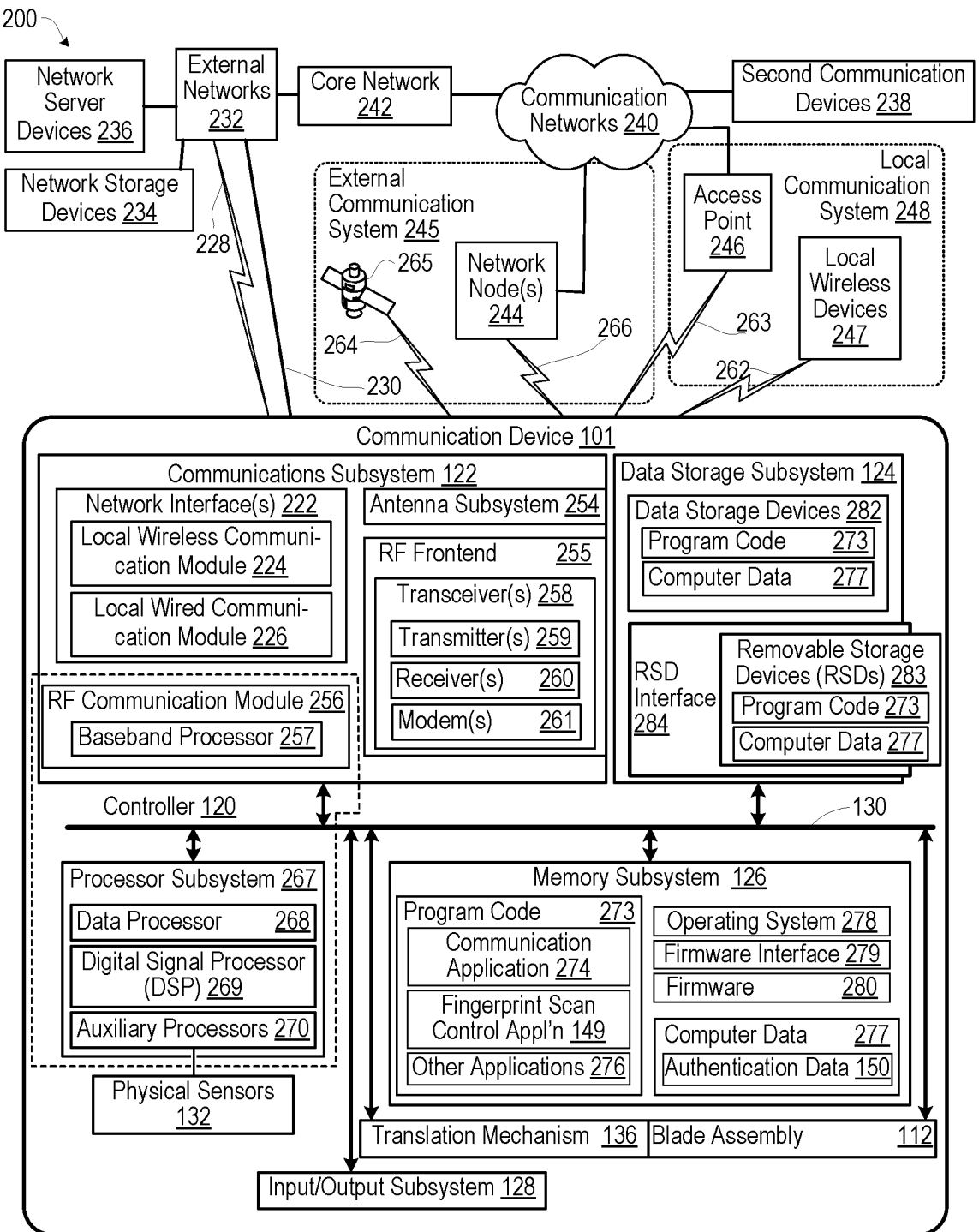
FIG. 2 depicts a functional block diagram of a communication environment including the communication device of FIG. 1, according to one or more embodiments.

FIG. 2 depicts a functional block diagram of communication environment 200 including communication device 101 that includes additional optional features to support wireless network communication. In one or more embodiments, communications subsystem 122 may include one or more network interfaces 222, such as local wireless communication module 224 and local wired communication module 226, to communicatively couple communication device 101 respectively via wireless connection 228 or network cable 230 to external networks 232. Communication device 101, via external networks 232, may connect to network storage devices 234 that store computer data and to network server devices 236 that facilitate access to network storage devices 234. Network server devices 236 may have identical or similar components and functionality as described above for communication device 101. Communication device 101 may communicate with second communication devices 238 via external networks 232 or via communication networks 240 that are supported by core networks 242. Network interface(s) 222 may include a network interface controller (NIC) and support one or more network communication protocols. External networks 232 can include a local area network (LAN), a campus area network (CAN), a metropolitan area network (MAN), or a wide area network (WAN). For example, wireless connection 228 and network cable 230 can be an Ethernet connection/cable.

In one or more embodiments, communications subsystem 122 may include additional functionality for communicating, using a cellular connection, with network node(s) 244 of external communications system 245 and for communicating, using a wireless connection, with wireless access point 246 or local wireless devices 247 of local communications system 248. Examples of local wireless devices may include a printing device, an external monitor, and a wireless keyboard. Communications subsystem 122 includes antenna subsystem 254. Communications subsystem 122 includes radio frequency (RF) front end 255 and RF communication module 256 having baseband processor 257. RF front end 255 includes transceiver(s) 258, which includes transmitter(s) 259 and receiver(s) 260. RF front end 255 further includes modem(s) 261. Baseband processor 257 of RF communication module 256 communicates with controller 120 and RF front end 255. Baseband processor 257 operates in a baseband frequency range to encode data for transmission and decode received data, according to a communication protocol. Modem(s) 261 modulates baseband encoded data from RF communication module 256 onto a carrier signal to provide a transmit signal that is amplified by transmitter(s) 259. Modem(s) 261 demodulates each signal received using antenna subsystem 254 from external communications system 245 or local communications system 248. The received signal is amplified and filtered by receiver(s) 260, which demodulates received encoded data from a received carrier signal.

In one or more embodiments, controller 120, via communications subsystem 122, performs multiple types of cellular over-the-air (OTA) or wireless communication with local communications system 248. Communications subsystem 122 can communicate via an OTA connection 262 with local wireless devices 247. In an example, OTA connection 262 is a Bluetooth connection, or other personal access network (PAN) connection. Communications subsystem 122 can communicate via an OTA connection 263 with access point 246. In one or more embodiments, communications subsystem 122 communicates with one or more locally networked devices via a wireless local area network (WLAN) link supported by access point 246. In one or more embodiments, access point 246 supports communication using one or more IEEE 802.11 WLAN protocols. Access point 246 is connected to communication networks 240 via a cellular or wired connection. In one or more embodiments, communications subsystem 122 receives downlink channels 264 from GPS satellites 265 to obtain geospatial location information. Communications subsystem 122 can communicate via an over-the-air (OTA) cellular connection 266 with network node(s) 244.

Controller 120 includes processor subsystem 267, which includes one or more central processing units (CPUs), depicted as data processor 268. Processor subsystem 267 can include one or more digital signal processors 269 that can be integrated with data processor 268. Processor subsystem 267 can include other processors that are communicatively coupled to data processor 268, such as baseband processors 257 of communication module 256. In another example, auxiliary processors 270 may act as a low power consumption, always-on sensor hub for physical sensors 132. In one or more embodiments that are not depicted, controller 120 can further include distributed processing and control components that are external to housing 106 or grouped with other components, such as I/O subsystem 128. Controller 120 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 126 stores program code 273 for execution by processor subsystem 267 to provide the functionality described herein. Program code 273 includes applications such as communication application 274 and fingerprint scan control application 149 that may be software or firmware that controls operation of fingerprint scanners 102a-102b (FIG. 1) and blade assembly 112. Program code 273 may include other applications 276 that generate first and second user interfaces 154a-154b for first and second functions 152a-152b (FIG. 1). In one or more embodiments, several of the described aspects of the present disclosure are provided via executable program code of applications executed by controller 120. In one or more embodiments, program code 273 may be integrated into a distinct chipset or hardware module as firmware that operates separately from executable program code. Portions of program code 273 may be incorporated into different hardware components that operate in a distributed or collaborative manner. Implementation of program code 273 may use any known mechanism or process for doing so using integrated hardware and/or software, as known by those skilled in the art. Program code 273 may access, use, generate, modify, store, or communicate computer data 277, such as authentication data 150.

Computer data 277 may incorporate "data" that originated as raw, real-world "analog" information that consists of basic facts and figures. Computer data 277 includes different forms of data, such as numerical data, images, coding, notes, and financial data. Computer data 277 may originate at communication device 101 or be retrieved by communication device 101. Communication device 101 may store, modify, present, or transmit computer data 277. Computer data 277 may be organized in one of a number of different data structures. Common examples of computer data 277 include video, graphics, text, and images as discussed herein. Computer data 277 can also be in other forms of flat files, databases, and other data structures.

Memory subsystem 126 further includes operating system (OS) 278, firmware interface 279, such as basic input/output system (BIOS) or Uniform Extensible Firmware Interface (UEFI), and firmware 280, which may be considered as program code 273.

Data storage subsystem 124 of communication device 101 includes data storage device(s) 282. Controller 120 is communicatively connected, via system interlink 130, to data storage device(s) 282. Data storage subsystem 124 provides program code 273 and computer data 277 stored on non-volatile storage that is accessible by controller 120. For example, data storage subsystem 124 can provide a selection of program code 273 and computer data 277. These applications can be loaded into memory subsystem 126 for execution/processing by controller 120. In one or more embodiments, data storage device(s) 282 can include hard disk drives (HDDs), optical disk drives, and/or solid-state drives (SSDs), etc. Data storage subsystem 124 of communication device 101 can include removable storage device(s) (RSD(s)) 283, which is received in RSD interface 284. Controller 120 is communicatively connected to RSD 283, via system interlink 130 and RSD interface 284. In one or more embodiments, RSD 283 is a non-transitory computer program product or computer readable storage device. Controller 120 can access data storage device(s) 282 or RSD 283 to provision communication device 101 with program code 273.

Figure 3A:
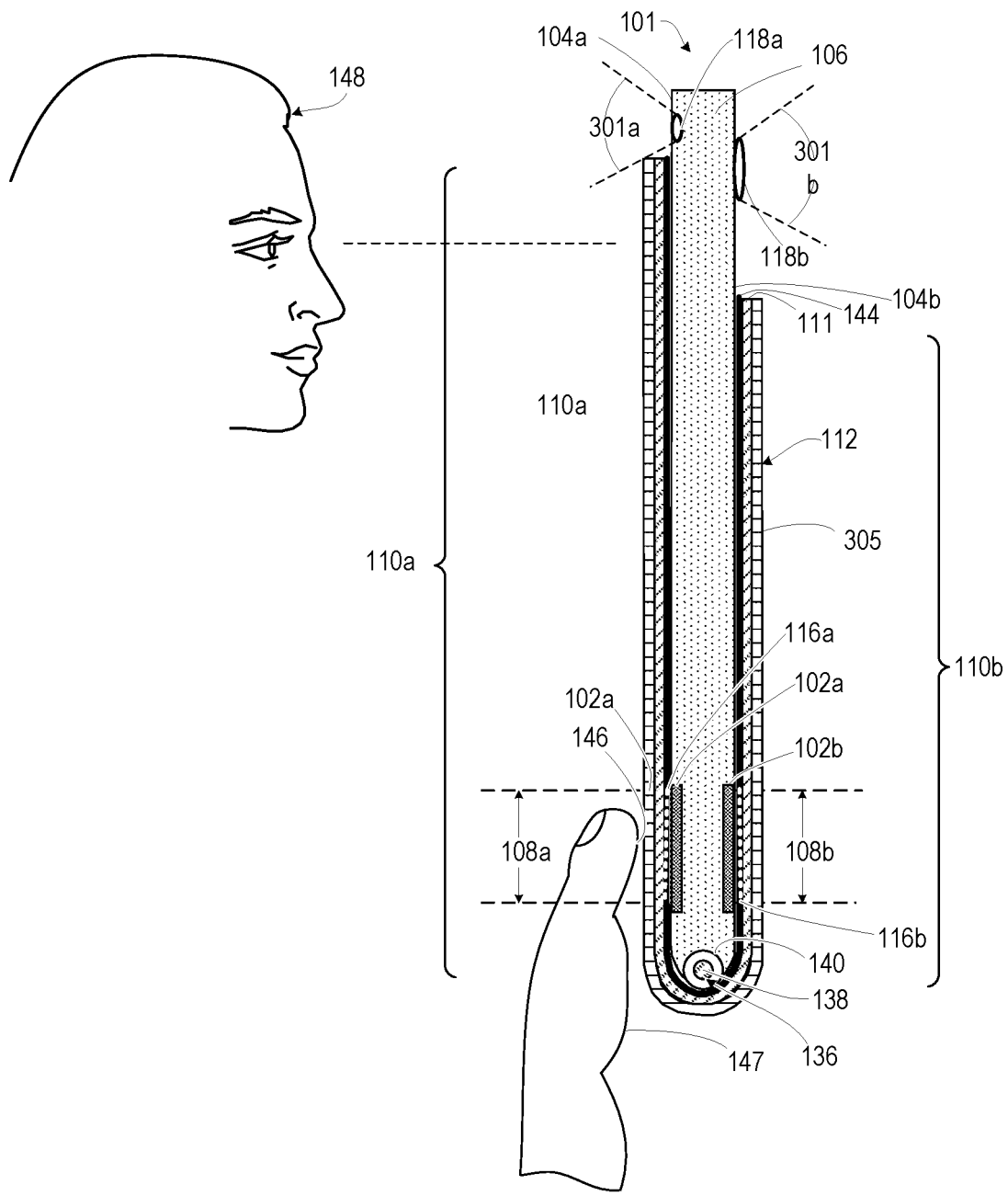
FIG. 3A depicts a left side view of the example communication device having the blade assembly in the fully retracted position with a user, who is viewing the front display, positioning a finger at a first finger-on-display (FOD) area of the blade assembly, which is aligned with the front fingerprint scanner, according to one or more embodiments.

FIG. 3A depicts a left side view of communication device 101 having blade assembly 112 in the fully retracted position. User 148 is on front side 104a of communication device 101 viewing front display 110a. User 148 is in front field of view (FOV) 301a of front image capturing device 118a, and user 148 is not visible within back FOV 301b of back image capturing device 118b. User 148 is positioning finger 147 at first FOD area 116a of blade assembly 112, which is aligned with front fingerprint scanner 102a at front FOD location 108a of device housing 106. Blade assembly 112 has flexible protective cover 305 laminated to flexible display 111 and attached to blade substrate 144. Roller 140 of translation mechanism 136 is engaged to an underside of blade substrate 144 at bottom edge 142.

Figure 3B:
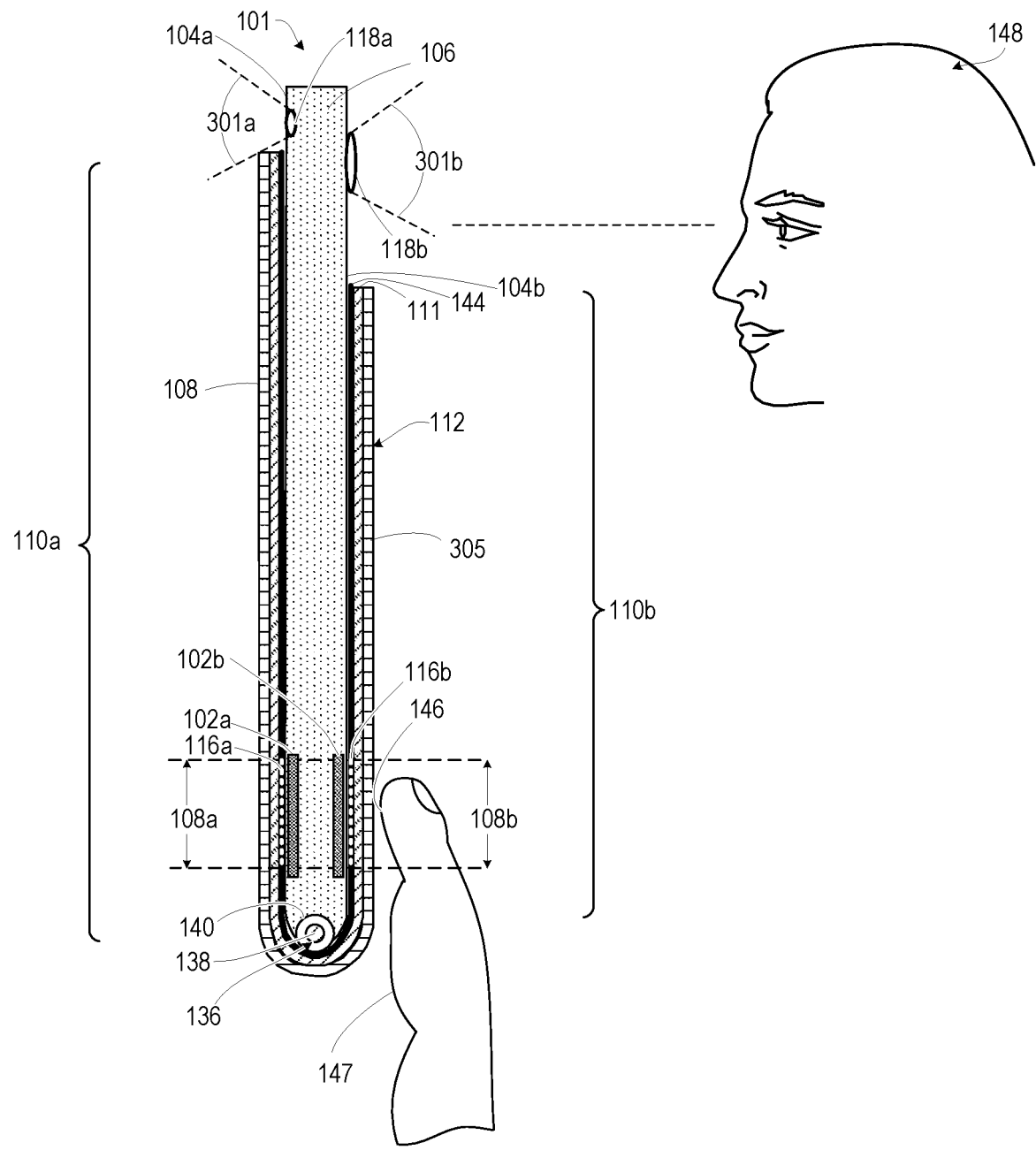
FIG. 3B depicts a left side view of the example communication device having the blade assembly in the fully retracted position with the user, who is viewing the back display, positioning a finger at a second FOD area of the blade assembly, which is aligned with the back fingerprint scanner, according to one or more embodiments.

FIG. 3B depicts a left side view of communication device 101 that is depicted identical to communication device 101 of FIG. 3B but having user 148 in back FOV 301b of back image capturing device 118b. User 148 is on back side 104b of communication device 101 viewing back display 110b. User 148 is not visible within front FOV 301a of front image capturing device 118a. User 148 is positioning finger 147 at second FOD area 116b of blade assembly 112, which is aligned with back fingerprint scanner 102b at back FOD location 108b of device housing 106.

Figure 3C:
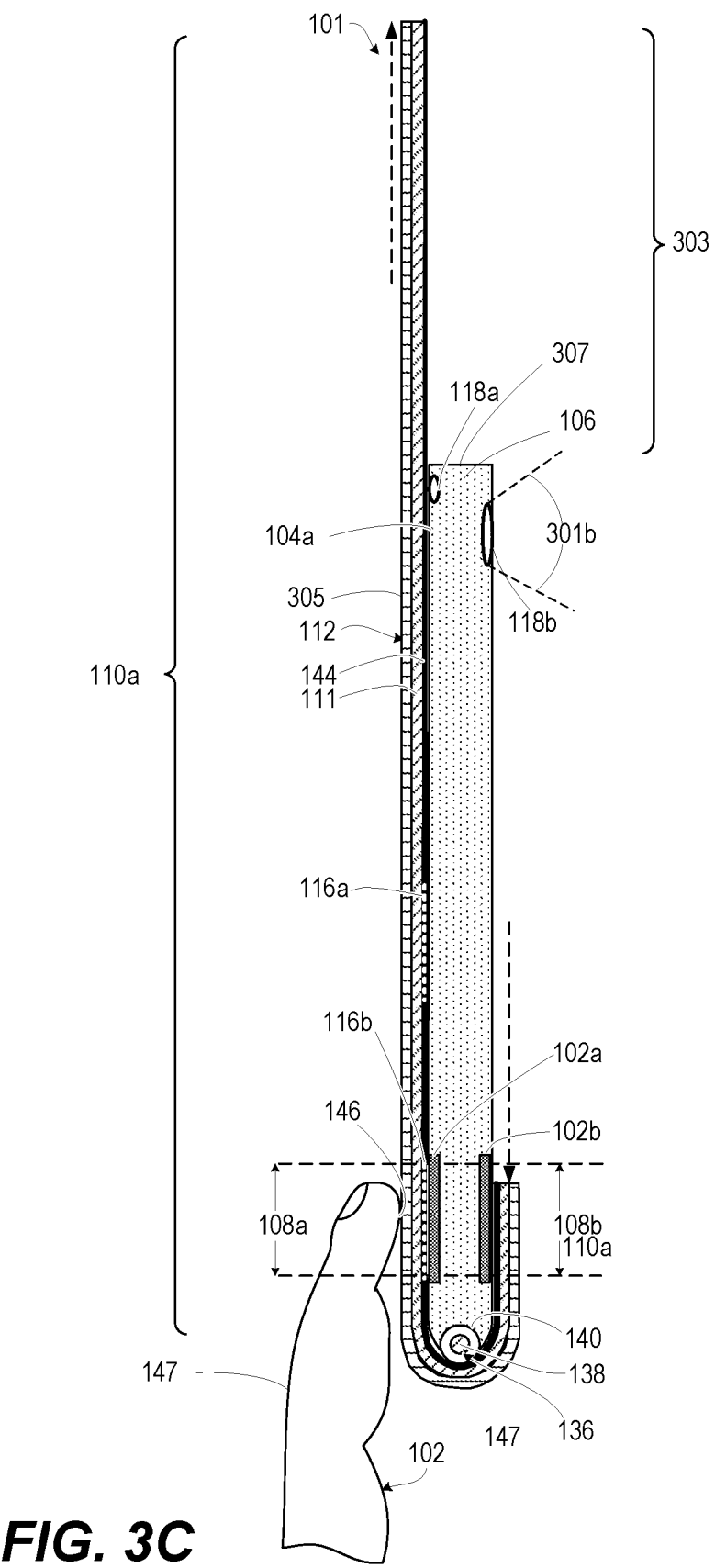
FIG. 3C depicts a left side view of the example communication device of FIG. 3A having the blade assembly in a fully extended position with the finger of the user positioned at the second FOD area, which is aligned with the front fingerprint scanner when the blade assembly is in the fully extended position, according to one or more embodiments.

FIG. 3C depicts a left side view of communication device 101 having blade assembly 112 in a fully extended position. Blade substrate 144 supports extending portion 303 of flexible display 111 that extends upward from top edge 307 of device housing 106, increasing display size of front display 110a. Back display 110b (FIG. 1) is no longer available and user 148 is presumed to be viewing front side 104a of communication device 101. Finger 147 of user 148 is positioned at second FOD area 116b of blade assembly 112, which is aligned with front fingerprint scanner 102a at front FOD location 108a of device housing 106.

According to further first aspects of the present disclosure, in response to determining that a requirement exists for scanning fingerprint 146 of finger 147 of user 148, controller 120 (FIG. 1) of communication device 101 determines whether both front and back displays 110a-110b are available (i.e., blade assembly 112 is in the fully retracted position (FIGS. 3A-3B). In response to blade assembly 112 being in the fully retracted position, controller 120 (FIG. 1) triggers front and back image capturing devices 118*a*-118*b* to capture a respective front preview image of front FOV 301*a* and back preview image of back FOV 301*b*. Controller 120 (FIG. 1) determines by evaluating the front preview image and the back preview image whether user 148 is identified as facing one of front side 104*a*, as in FIG. 3A, or back side 104*b*, as in FIG. 3B, of communication device 101. Controller 120 (FIG. 1) triggers front fingerprint scanner 102*a* in response to identifying user 148 as facing front side 104*a* of communication device 101 while blade assembly 112 is in the fully retracted position. Controller 120 (FIG. 1) triggers back fingerprint scanner 102*b* in response to identifying user 148 as facing back side 104*b* of communication device 101 while blade assembly 112 is in the fully retracted position. Alternatively, or in addition, in response to determining that a requirement exists for scanning fingerprint 146 of finger 147 of user 148, controller 120 (FIG. 1) of communication device 101 determines whether only front display 110*a* is available (i.e., blade assembly 112 is in the fully extended position (FIG. 3C). In response to being in the fully extended position, controller 120 (FIG. 1) activates only front fingerprint scanner 102*a*.

Figure 4:
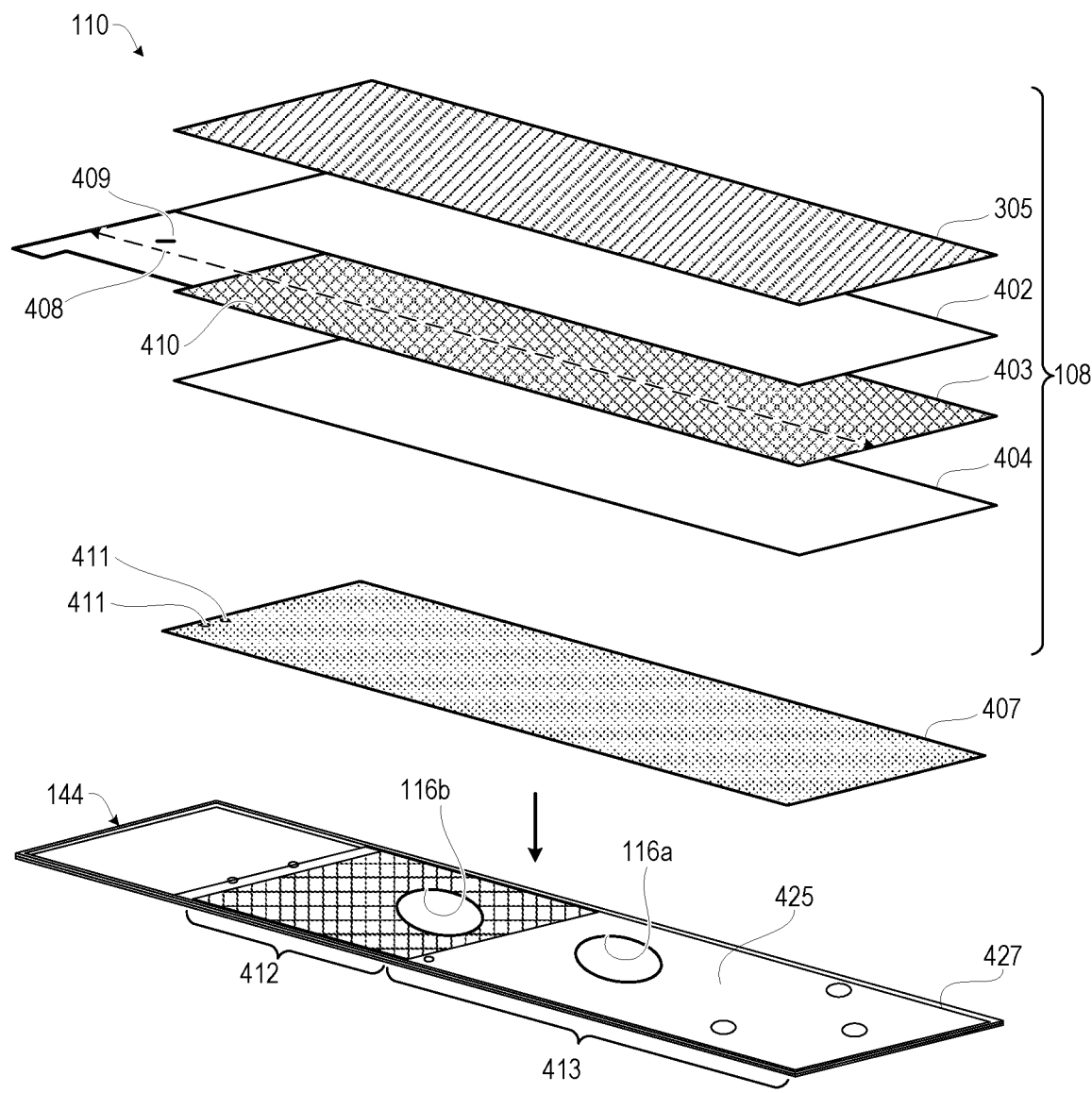
FIG. 4 depicts the blade assembly with a blade and a flexible display in an exploded view, according to one or more embodiments.

FIG. 4 illustrates blade assembly 110 with blade substrate 144 and with flexible display 111 in an exploded view. In one or more embodiments, flexible display 111 includes one or more layers that are coupled or laminated together to complete flexible display 111. In an example, flexible display 111 includes flexible protective cover 305, first adhesive layer 402, flexible display layer 403, second adhesive layer 404 and flexible substrate 407. Beginning from the top of the layer stack opposite to blade substrate 144, in one or more embodiments, flexible protective cover 305 includes an optically transparent substrate such as a thin film sheet of a thermoplastic material. In an example, flexible protective cover 305 is manufactured from a layer of optically transparent polyamide or polycarbonate having a thickness of about eighty microns. Flexible protective cover 305 may function as a fascia by defining a cover for flexible display layer 403. In one or more embodiments, flexible protective cover 305 is optically transparent, in that light can pass through the flexible protective cover 305 so that objects behind flexible protective cover 305 can be distinctly seen. Flexible protective cover 305 may optionally include an ultra-violet barrier. Such a barrier can be useful in improving the visibility of flexible display layer 403. Blade substrate 144 includes first and second fingerprint areas 116*a*-116*b* that allow light from front and back fingerprint scanners 102*a*-102*b* (FIG. 1) to pass through blade substrate 144.

Beneath flexible protective cover 305 is first adhesive layer 402. In one or more embodiments, first adhesive layer 402 is an optically transparent adhesive. The optically transparent adhesive can be applied to two sides of a thin, optically transparent substrate such that the first adhesive layer 402 functions as an optically transparent layer having optically transparent adhesive on both sides. Where so configured as "double-sided tape", first adhesive layer 402 may have a thickness of about fifty microns that can then be spooled and applied between, to couple together, flexible protective cover 305 and flexible display layer 403. In other embodiments, first adhesive layer 402 may be applied between flexible protective cover 305 and the display layer 403 as an optically transparent liquid or gel that is allowed to cure or optionally cured by heat, ultraviolet light, or other techniques. First adhesive layer 402 mechanically couples flexible display layer 403 to flexible protective cover 305.

Flexible display layer 403 includes image producing portion 409 having a same length and width, and aligned with, flexible protective cover 305 and flexible substrate 407. In one or more embodiments, flexible display layer 403 includes T-shaped tongue 410 attached along major axis 408 of flexible display layer 403. Blade substrate 144 is sized to receive flexible display layer 403 attached to T-shaped tongue 410. In one or more embodiments, electronic circuit components configured to operate image producing portion 409 of the flexible display layer 403, connectors, and other components can be coupled to this T-shaped tongue 410 and further coupled to image producing portion 409 of flexible display 111. For instance, as shown in FIG. 4, flexible display layer 403 includes a T-shaped tongue 410 that extends beyond image producing portion 409 of flexible display layer 403 and other layers (401, 402, 404, 405, and 407) of flexible display 111. While T-shaped tongue 410 is T-shaped in this illustrative embodiment, T-shaped tongue 410 can take other shapes.

Flexible display layer 403 optionally may be touch-sensitive. In one or more embodiments, flexible display layer 403 is an organic light emitting diode (OLED) display layer. When coupled to flexible substrate 407, flexible display layer 403 can bend in accordance with various bending radii. For example, some embodiments allow bending radii of between thirty and six hundred millimeters. Other substrates allow bending radii of around five millimeters to provide a display that is foldable through active bending. Other configurations of flexible display 111 may accommodate both bends and folds. In one or more embodiments, flexible display layer 403 may be formed from multiple layers of flexible material such as flexible sheets of polymer or other materials. Flexible display layer 403 may include a layer of optically pellucid electrical conductors, a polarizer layer, one or more optically transparent substrates, and layers of electronic control circuitry such as thin film transistors to actuate pixels and one or more capacitors for energy storage. In one or more embodiments, flexible display layer 403 has a thickness of about 130 microns.

In one or more embodiments, to be touch sensitive, flexible display layer 403 includes a layer including one or more optically transparent electrodes. In one or more embodiments, flexible display layer 403 includes an organic light emitting diode layer configured to present images and other information to user 102 (FIG. 1). The organic light emitting diode layer can include one or more pixel structures arranged in an array, with each pixel structure including a plurality of electroluminescent elements, such as organic light emitting diodes. These various layers can be coupled to one or more optically transparent substrates of flexible display layer 403. In one or more embodiments, flexible substrate 407 includes a thin layer of steel having a thickness of about thirty microns. In one or more embodiments, flexible substrate 407 includes a thin layer of thermoplastic material.

In other embodiments, a layer (401-402) above flexible display layer 403 may be configured with enough stiffness to make the flexible substrate 407 unnecessary. In an example, flexible protective cover 305 is configured with enough stiffness to provide sufficient protection for flexible display 111 during bending, enabling flexible substrate 407 to be omitted.

Flexible display 111 is supported by flexible substrate 407 and by blade substrate 144 having blade substrate 425. In one or more embodiments, blade substrate 425 includes a layer of steel. In one or more embodiments, blade substrate 425 is thicker than flexible substrate 407. In an example, flexible substrate 407 includes a steel layer with a thickness of about thirty microns and blade substrate 425 includes a layer of steel having a thickness of about one hundred microns. In one or more embodiments, blade substrate 425 is a rigid, substantially planar support layer. In an example, blade substrate 425 may be manufactured from stainless steel, from a thin, rigid thermoplastic sheet, or from nitinol material, which is a nickel-titanium alloy.

In one or more embodiments, the flexible substrate 407 is slightly longer along a major axis of the flexible substrate 407 than is the image producing portion 409 of the flexible display 111. Since the T-shaped tongue 410 is T-shaped, this allows one or more apertures 411 to be exposed on either side of the base of the T of the T-shaped tongue 410. As will be described in more detail below, this extra length along the major axis provided by the flexible substrate 407 allows one or more fasteners to rigidly couple the first end of the flexible substrate 407 to a tensioner.

Embodiments of the disclosure contemplate that some of the layers comprising the flexible display 111 are stiffer than others. Similarly, other layers of the flexible display 111 are softer than others. For example, where the flexible substrate 407 is manufactured from a metal, one example of which is stainless steel, this layer is stiffer than the first adhesive layer 402. In one or more embodiments, the flexible substrate 407 is the stiffest layer in the flexible display 111, while the first adhesive layer is the softest layers of the flexible display 111. The flexible protective cover 305 and the flexible display layer 403 have a stiffness that falls between that of the flexible substrate 407 and the adhesive layers in one or more embodiments.

In one or more embodiments, blade substrate 425 of blade substrate 144 includes both flexible portion 412 and rigid portion 413. Flexible portion 412 is positioned to encounter bending in translation of blade assembly 110 from the retracted position to the extended position. Rigid portion 413 is positioned to remain on front side 104a of device housing 106 (FIG. 1) during translation. In the extended position, rigid portion 413 extends beyond front side 104a of device housing 106 (FIG. 1). In an example, blade substrate 425 is manufactured from a metal such as steel having a thickness of one hundred microns that provides rigidity to rigid portion 413.

In one or more embodiments, blade substrate 144 includes silicone border 427 positioned around a perimeter of blade substrate 425 to protect the edges of flexible display 111 when attached to blade substrate 425 of blade substrate 144. In one or more embodiments, silicone border 427 is co-molded around the perimeter of blade substrate 425.

In one or more embodiments, rigid portion 413 of blade substrate 425 can define one or more apertures. These apertures can be used for a variety of purposes. In an example, some of the apertures can be used to rigidly fasten blade substrate 144 to translation mechanism 136 (FIG. 1), such as a display roller mechanism. Additionally, some of the apertures can contain magnets. Hall-effect sensors positioned in device housing 106 (FIG. 1) to which blade assembly 110 is coupled can then detect the positions of these magnets such that controller 120 (FIG. 1) can determine whether blade assembly 110 including flexible display 111 are in the extended position, the retracted position, the peek position, or an intermediate position.

In one or more embodiments, flexible display 111 is coupled to blade substrate 425 of blade substrate 144 within the confines of silicone border 427. In an example, a first end of flexible display 111 is adhesively coupled to rigid portion 413 of blade substrate 425 of blade substrate 144. The other end of flexible display 111 may be rigidly coupled to a tensioner by passing fasteners through apertures 411 of flexible substrate 407.

Figure 5:
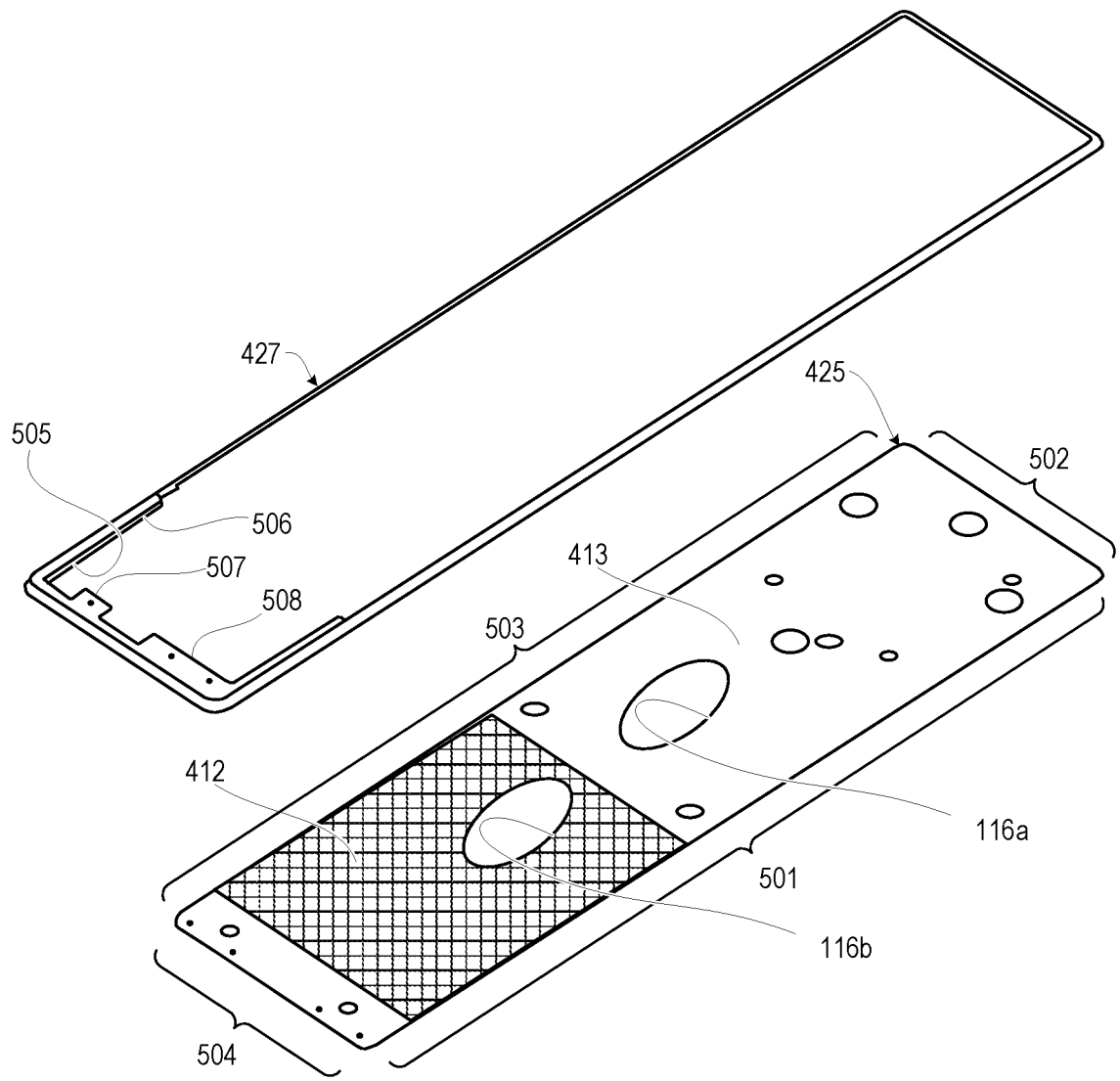
FIG. 5 depicts a blade substrate and a silicone border in an exploded view, according to one or more embodiments.

FIG. 5 depicts blade substrate 425 and silicone border 427 shown in an exploded view. Silicone border 427 defines a singular, contiguous, unitary piece of silicone. In the illustrative embodiment of FIG. 5, silicone border 427 surrounds three sides 501, 502, and 503 of blade substrate 425, and extends beyond minor side 504 to define receiving recess 505 that can accommodate mechanical and electrical components such as electronic circuit components to provide power and control for flexible display 111 (FIG. 4) that will situate within the perimeter defined by silicone border 427. A tensioner may keep flexible display 111 (FIG. 4) flat across flexible portion 412 of blade substrate 425, flexible circuits, and other components. In one or more embodiments, portions 506, 507, 508 of silicone border 427 extending beyond minor side 504 of blade substrate 425 surrounding receiving recess 505 are thicker than are the other portions of silicone border 427 that will surround flexible display 111 (FIG. 4), enabling components to be placed within receiving recess 505.

Figure 6:
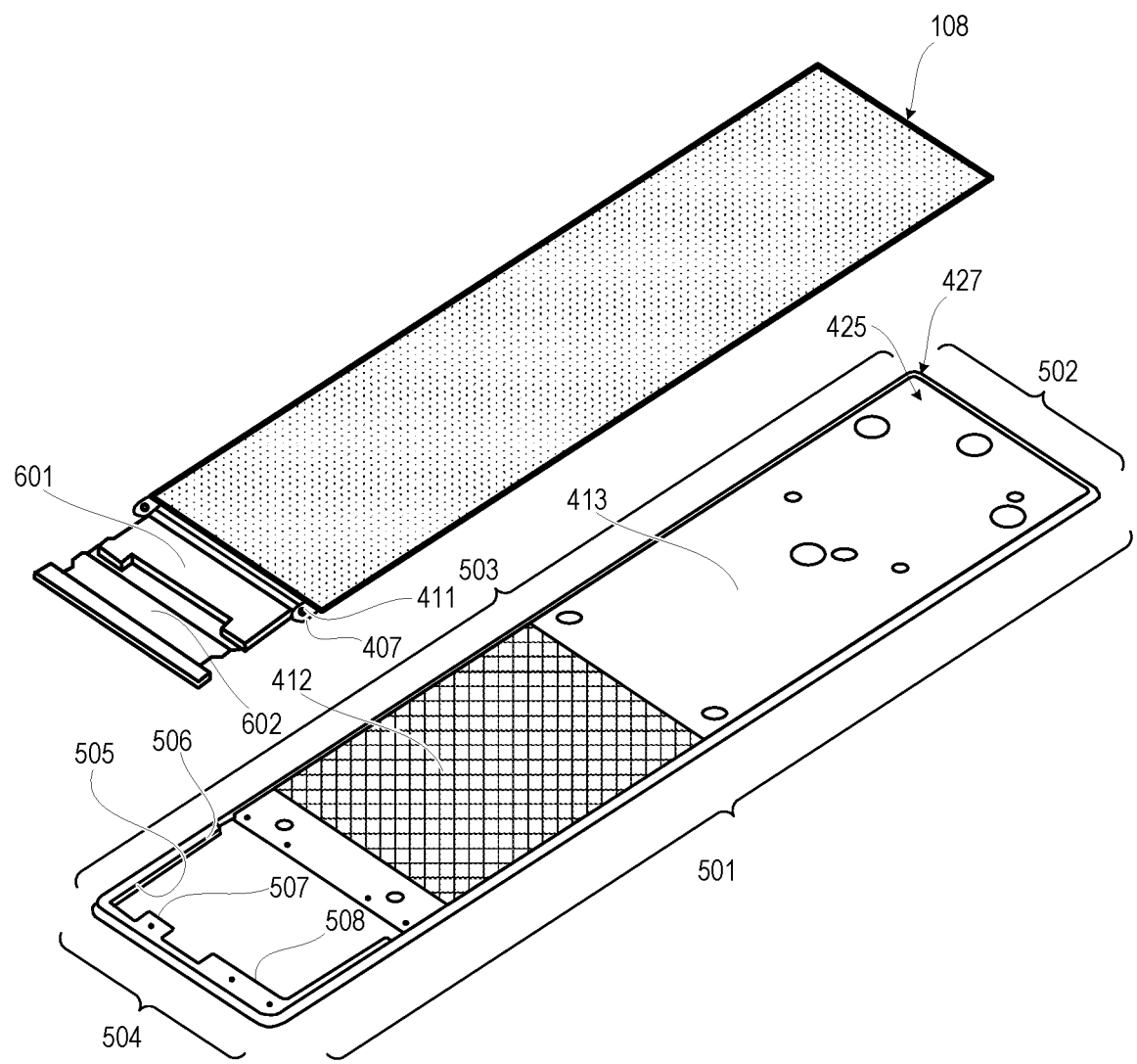
FIG. 6 depicts the flexible display and the blade with silicone border over-molded on the blade substrate, according to one or more embodiments.

FIG. 6 depicts flexible display 111 and blade substrate 144 with silicone border 427 over-molded on blade substrate 425. Silicone border 427 surrounds three sides 501, 502, and 503 of blade substrate 425 and extends beyond minor side 504 to define receiving recess 505 that can accommodate mechanical and electrical components. Electronic circuits 601 that are operable to provide power and control for flexible display 111 have been coupled to T-shaped tongue 410 of flexible display layer 403 (FIG. 4). Additionally, mechanical connector 602 has been connected to the top of the T on T-shaped tongue 410. Flexible substrate 407 extends beyond a distal end of flexible display layer 403 (FIG. 4) so that apertures 411 defined therein can be coupled to a tensioner to ensure that flexible display 111 stays flat around flexible portion 412 of blade substrate 425 when flexible portion 412 of blade substrate 425 passes around a rotor positioned at the end of device housing 106 (FIG. 1).

In one or more embodiments, blade substrate 144 can be fixedly coupled to flexible display 111. In an example, flexible display 111 is coupled to rigid portion 413 by an adhesive or other coupling mechanism. A tensioner can then be positioned in receiving recess 505. In one or more embodiments, the tensioner rigidly couples with fasteners to the apertures 411 (FIG. 4) of flexible substrate 407 (FIG. 4) to keep flexible display 111 flat across flexible portion 412, regardless of how flexible portion 412 is being bent around the minor surface of device housing 106 or a corresponding rotor.

Figure 7:
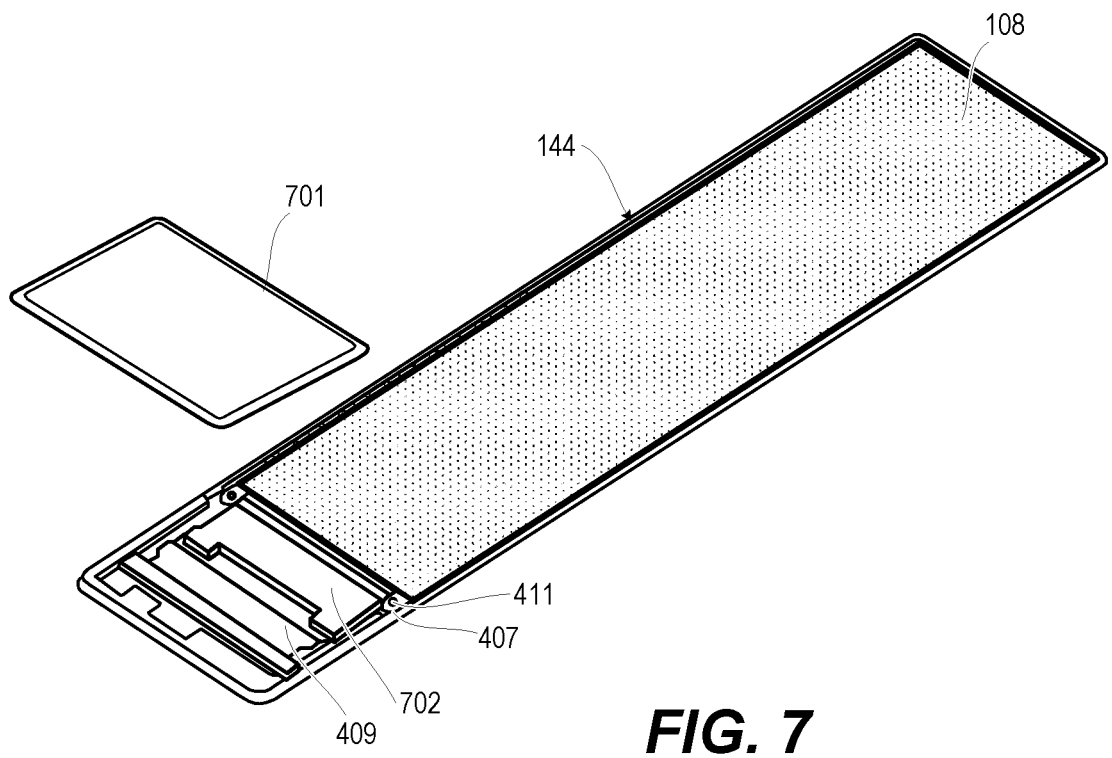
FIG. 7 depicts the flexible display after being coupled to the blade surrounded by a silicone border, according to one or more embodiments.
Figure 8:
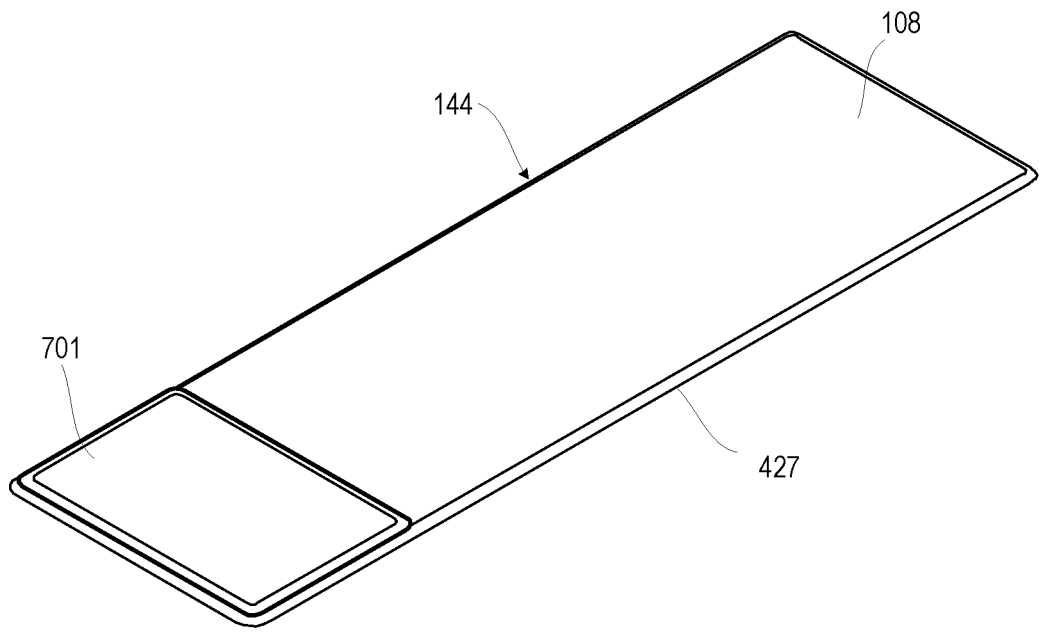
FIG. 8 depicts the blade assembly completely configured with a cover and in an unrolled state, according to one or more embodiments.

FIG. 7 depicts flexible display 111 after being coupled to blade substrate 144. Silicone border 427 surrounds the flexible display 111, with silicone border 427 surrounding and abutting three sides of the flexible display layer (403). A flexible substrate is then connected to the electronic circuits 601 carried by the T-shaped tongue 410. Additionally, a tensioner can be coupled to the flexible substrate 407. Thereafter, cover 701 is attached to silicone border 427 atop the electronic circuits 702 and other components situated on or around the T-shaped tongue 410. This portion of blade assembly 110 where the components are stored beneath cover 701 may be referred to as the "backpack." FIG. 8 depicts blade assembly 110 completely configured with cover 701.

Figure 9:
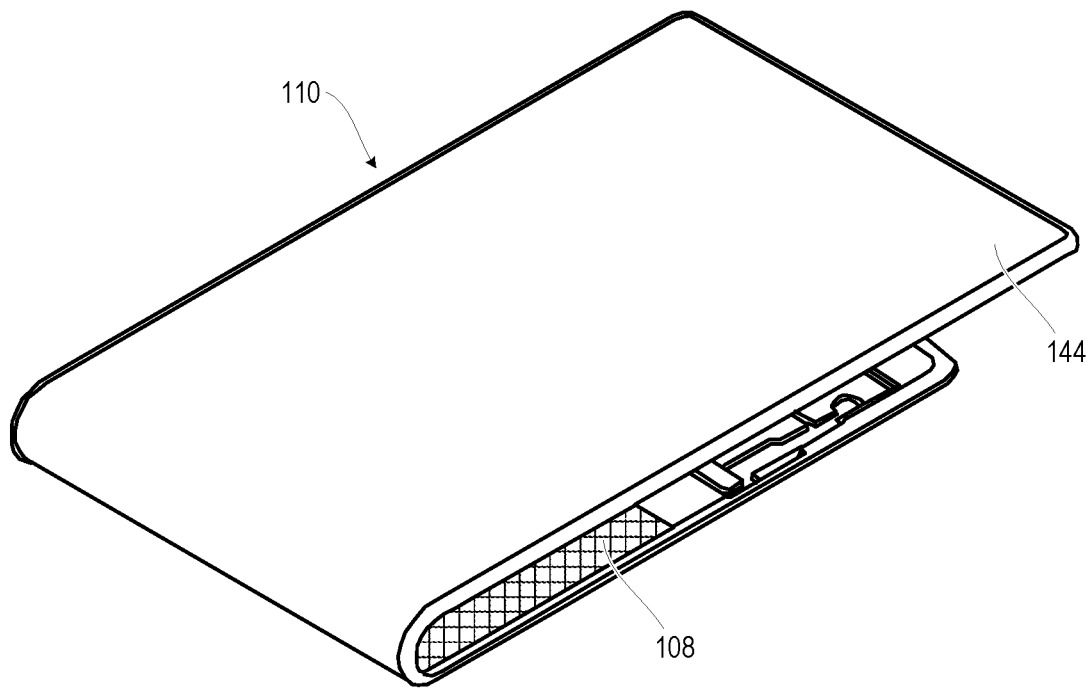
FIG. 9 depicts the blade assembly in a fully retracted state, according to one or more embodiments.
Figure 10:
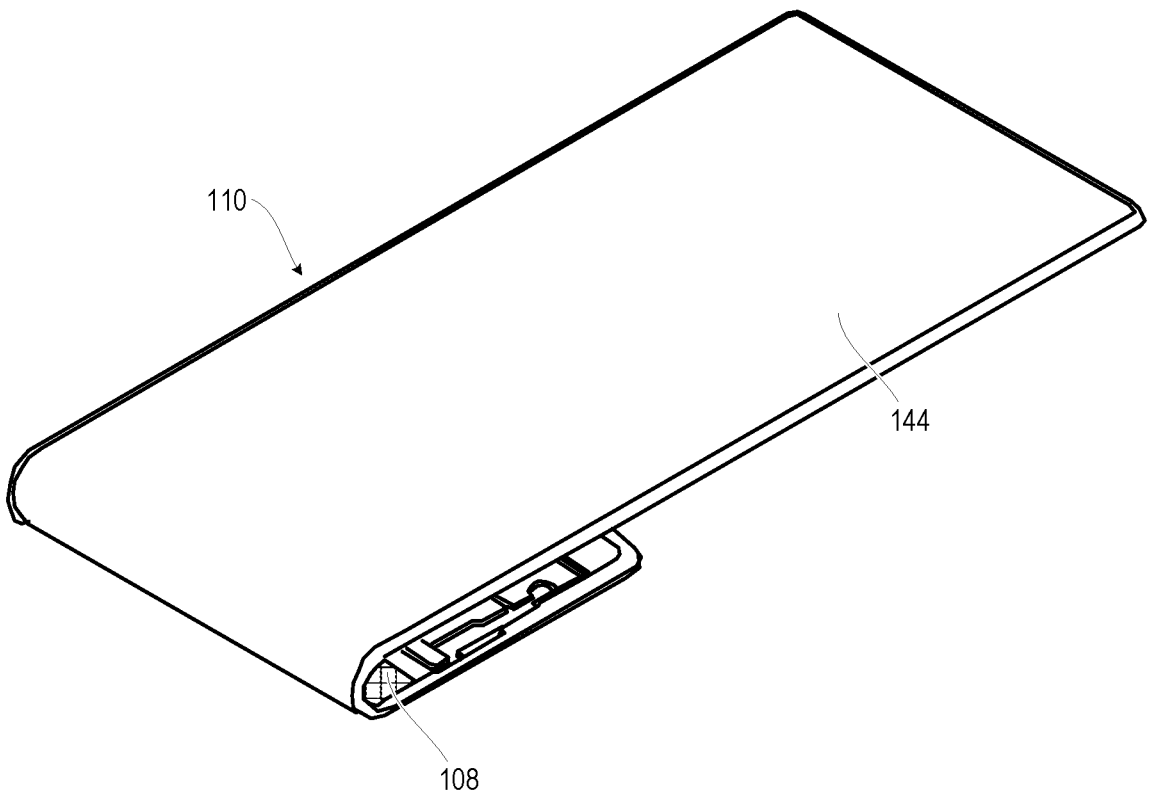
FIG. 10 depicts the blade assembly in a fully extended state, according to one or more embodiments.

FIG. 9 depicts blade assembly 110 in a fully retracted state. FIG. 10 depicts blade assembly 110 in a fully extended state. In one or more embodiments, flexible display 111 and blade substrate 144 are configured to wrap around a minor surface of device housing 106 (FIG. 1) where a display roller mechanism is situated. In one or more embodiments, the display roller mechanism includes a rotor that is positioned within a curvilinear section of flexible display 111 and blade substrate 144. When placed within device housing 106 (FIG. 1), translation of translation mechanism 136 (FIG. 1) causes translation of blade assembly 110, which in turn causes rotation of the rotor. The result is a linear translation of the flexible display 111 and blade substrate 144 across a translation surface of device housing 106 (FIG. 1) by drawing flexible display 111 and the blade substrate 144 around the rotor. As previously described, blade substrate 425 (FIG. 4) of blade assembly 110 includes flexible portion 412 (FIG. 4) that allows blade substrate 144 and flexible display 111 to deform around device housing 106 (FIG. 1), corresponding to the respective points of rolling depicted in FIGS. 9-10.

Figure 11A:
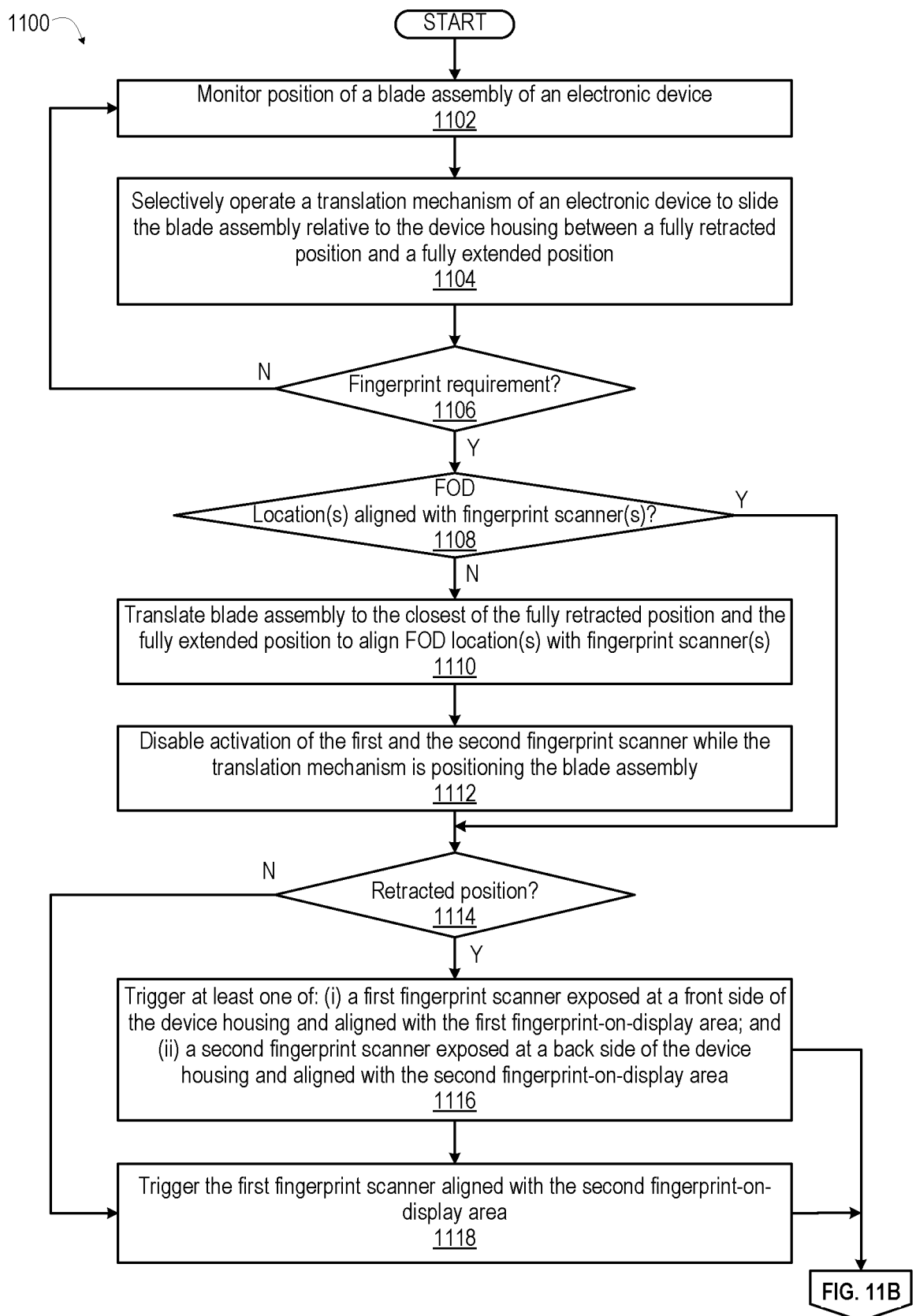
FIGS. 11A-11B (collectively "FIG. 11") are flow diagrams presenting a method of authenticating a user of a rollable display device having a blade assembly that provides finger-on-display locations that align with front and back fingerprint scanners, according to one or more embodiments.
Figure 11B:
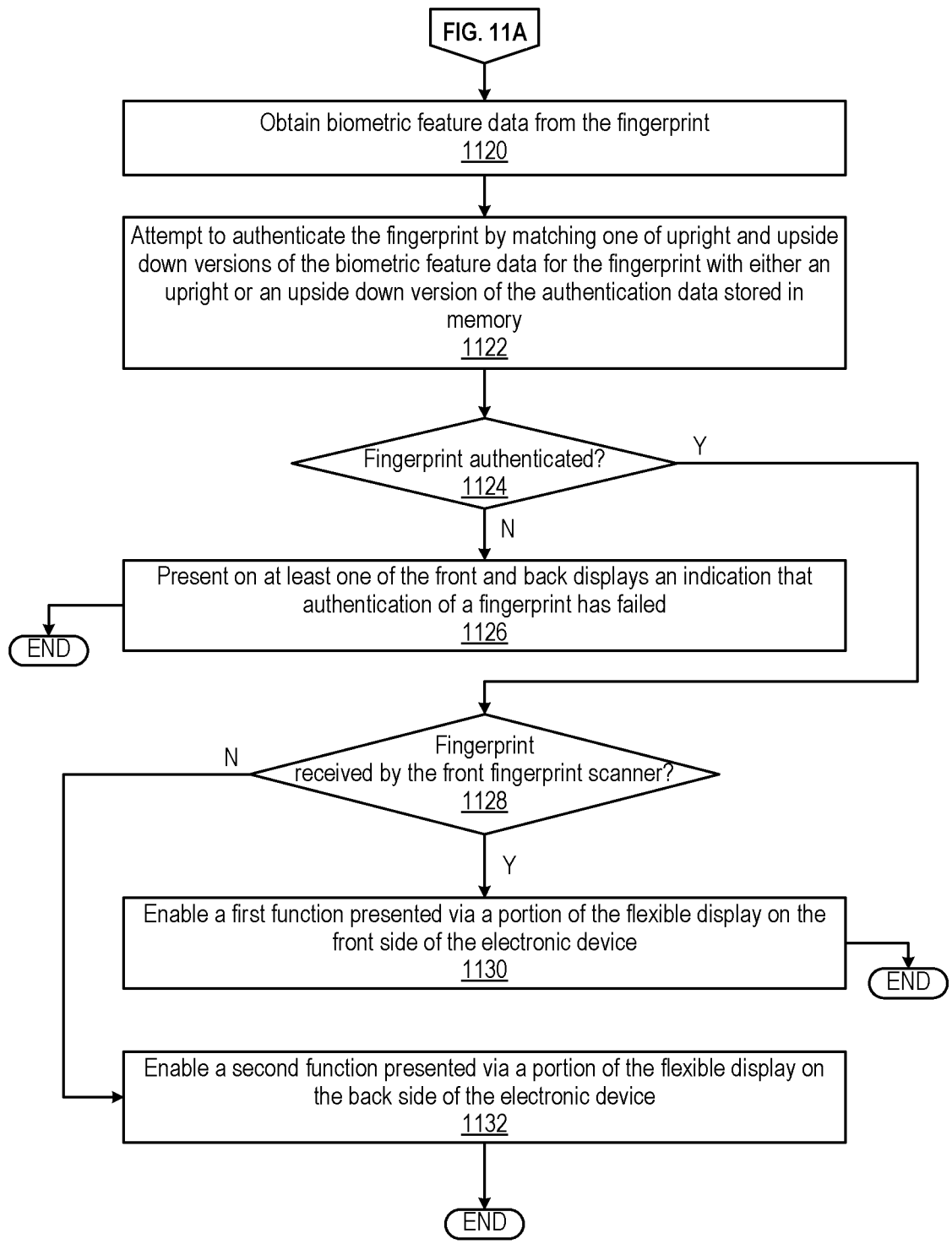
Figure 12:
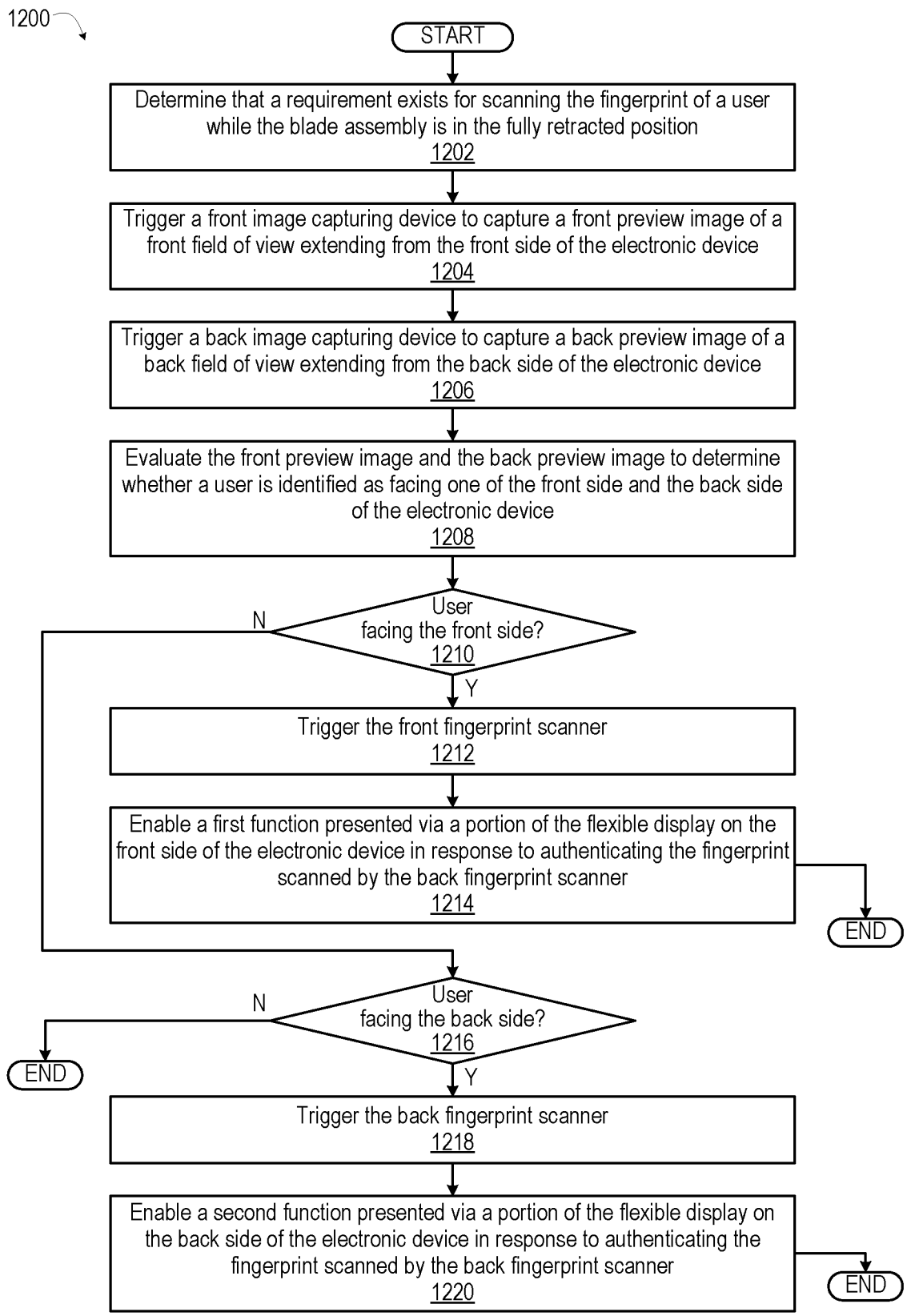
FIG. 12 is a flow diagram of a method of selecting one of the front and back fingerprint scanners based on detecting the user viewing a corresponding side of the rollable display device, according to one or more embodiments.

FIGS. 11A-11B (collectively "FIG. 11") are a flow diagram presenting method 1100 of authenticating a user of a rollable display device having a blade assembly that provides finger-on-display locations that align with front and back fingerprint scanner. FIG. 12 is a flow diagram of method 1200 of selecting one of the front and back fingerprint scanners based on detecting the user viewing a corresponding side of the rollable display device. Features of method 1200 (FIG. 12) may augment features of method 1100 (FIG. 11). The descriptions of method 1100 (FIG. 11) and method 1200 (FIG. 12) are provided with general reference to the specific components illustrated within the preceding FIGS. 1, 2, 3A-3C, and 4-10. Specific components referenced in method 1100 (FIG. 11) and method 1200 (FIG. 12) may be identical or similar to components of the same name used in describing preceding FIGS. 1, 2, 3A-3C, and 4-10. In one or more embodiments, controller 120 (FIGS. 1-2) configures communication device 101 (FIGS. 1-2) to provide the described functionality of method 1100 (FIG. 11) and method 1200 (FIG. 12).

With reference to FIG. 11A, method 1100 includes monitoring position of a blade assembly of an electronic device (block 1102). The blade assembly has a blade slidably coupled to the device housing and has a flexible display attached to the blade. The blade assembly has first and second fingerprint-on-display (FOD) areas that are optically transmissive, enabling light to pass through the blade assembly. Method 1100 includes selectively operating a translation mechanism of the electronic device to slide the blade assembly relative to a device housing between a fully retracted position and a fully extended position. (block 1104).

In one or more embodiments, the translation mechanism is configured to position the blade assembly only at the fully extended position and the fully retracted position. In one or more embodiments, the translation mechanism is configured to position the blade assembly between multiple positions including the fully extended position, the fully retracted position, and at least one intermediate position. In the fully retracted position, both of the front and back fingerprint scanners are available as being aligned respectively with the first and the second finger-on-display areas. In one or more embodiments, the back fingerprint scanner is aligned with the front fingerprint scanner for consistent FOD locations as viewed from either the front side or the back side of the electronic device. In one or more alternate embodiments, the back fingerprint scanner is not aligned with the front scanner, but the location of one or both of the scanner(s) is made visible to the user by presenting a fingerprint swirl or other scanner location identifier on the display. In one or more embodiments, the blade of the blade assembly includes sheet metal. The front and the back FOD areas include a respective hole in the sheet metal that allows light transmission through the blade assembly. In one or more embodiments, the blade of the blade assembly includes an opaque sheet metal and the front and the back FOD areas include a respective transmissive area of the blade surrounded by opaque sheet material. In the retracted position, portions of the flexible display may be activated and viewed on either the front side or the back side of the device housing. Thus, a fingerprint scanner is available on the viewed portion of the flexible display. In the extended position, the flexible display is rolled onto, and extends beyond, the front side of the device housing.

With continued reference to FIG. 11A, method 1100 includes determining whether a requirement exists for scanning a fingerprint of a user (decision block 1106). In response to determining that a requirement does not exist for scanning a fingerprint of a user, method 1100 returns to block 1102. In response to determining that a requirement exists for scanning a fingerprint of a user, method 1100 includes determining whether the blade assembly is in one of the fully retracted position or the fully extended position that aligns at least one of the FOD areas aligned with a corresponding one of the front and the back fingerprint scanners (decision block 1108). In response to determining that neither of the FOD areas is aligned with a corresponding one of the front and the back fingerprint scanners, method 1100 includes translating the blade assembly to the closest of the fully retracted position and the fully extended position to align at least one of the FOD location(s) with fingerprint scanner(s) (block 1110). Method 1100 includes disabling activation of the first and the back fingerprint scanner while the translation mechanism is positioning the blade assembly (block 1112). In response to determining that at least one of the FOD areas is aligned with a corresponding one of the front or the back fingerprint scanners in decision block 1108 or after block 1112, method 1100 includes determining whether the blade assembly is in the fully retracted position (decision block 1114). In response to determining that the blade assembly is in the fully retracted position, method 1100 includes triggering activation of at least one of: (i) a front fingerprint scanner exposed at a front side of the device housing and aligned with the first FOD area; and (ii) a back fingerprint scanner exposed at a back side of the device housing and aligned with the second FOD areas (block 1116). In one or more embodiments, method 1100 includes triggering activation of both the front and the back fingerprint scanners. Then method 1100 proceeds to block 1120 of FIG. 11B. In response to determining that the blade assembly is not in the fully retracted position in decision block 1108, and is thus in a fully extended position, method 1100 includes triggering activation of only the front fingerprint scanner that is aligned with the second FOD area of the blade assembly (block 1118). Then method 1100 proceeds to block 1120 of FIG. 11B.

With reference to FIG. 11B, after either block 1116 or 1118 (FIG. 11A), method 1100 includes obtaining biometric feature data from the fingerprint (block 1120). Method 1100 includes attempting to authenticate the fingerprint by matching one of upright and upside-down versions of the biometric feature data for the fingerprint with either an upright or an upside down version of the authentication data stored in memory (block 1122). Method 1100 includes determining whether the fingerprint is authenticated (decision block 1124). In response to determining that the fingerprint is not authenticated, method 1100 includes presenting on at least one of the front and back displays an indication that authentication of a fingerprint has failed (block 1126). Then method 1100 ends. In response to determining that the fingerprint is authenticated in decision block 1124, method 1100 includes determining whether the fingerprint was received by the front fingerprint scanner (decision block 1128). In response to determining the fingerprint was received by the front fingerprint scanner, method 1100 includes enabling a first function presented via a portion of the flexible display on the front side of the electronic device (block 1130). Then method 1100 ends. In response to determining the fingerprint was not received by the front fingerprint scanner (i.e., the fingerprint was received by the back fingerprint scanner) in decision block 1128, method 1100 includes enabling a second function presented via a portion of the flexible display on the back side of the electronic device (block 1132). Then method 1100 ends. First and second functions may be the same or different. In an example, the functions are customized for respective sizes of the front and back displays.

With reference to FIG. 12, as a precondition, method 1200 includes determining that a requirement exists for scanning the fingerprint of a user while the blade assembly is in the fully retracted position (block 1202). Method 1200 includes triggering a front image capturing device to capture a front preview image of a front field of view extending from the front side of the electronic device (block 1204). Method 1200 includes triggering a back image capturing device to capture a back preview image of a back field of view extending from the back side of the electronic device (block 1206). Method 1200 includes evaluating the front preview image and the back preview image to determining whether a user is identified as facing one of the front side and the back side of the electronic device (block 1208). Specifically, method 1200 includes determining whether the user is facing the front side (decision block 1210). In response to determining that the user is facing the front side, method 1200 includes triggering the front fingerprint scanner (block 1212). Method 1200 includes enabling a first function presented via a portion of the flexible display on the front side of the electronic device in response to authenticating the fingerprint scanned by the front fingerprint scanner (block 1214). Then method 1200 ends.

In response to determining in decision block 1210 that the user is not facing the front side of the device, method 1200 includes determining whether the user is facing the back side (decision block 1216). In response to determining that the user is facing the back side, method 1200 includes triggering the back fingerprint scanner (block 1218). Method 1200 includes enabling a second function presented via a portion of the flexible display on the back side of the electronic device in response to authenticating the fingerprint scanned by the front fingerprint scanner (block 1220). Then method 1200 ends. If unable to select one of the two fingerprint scanners based on detecting the user in a captured image, authentication of the user may be accomplished as previously described for method 1100 (FIG. 11) by selecting both fingerprint scanners without depending on location from which an image of the user is detected. In response to determining that the user is not facing the back side in decision block 1216, method 1200 ends.

According to second aspects of the present disclosure, a communication device may alter operation of front and back fingerprint scanners while in the fully retracted position based on whether the communication device is upright or upside down. In an example, fingerprint recognition may benefit from determining when to match an upside down fingerprint with the right side up user fingerprint stored on the device. In another example, fingerprint imaging may be easier to accomplish with a finger of a gripping hand on a side of the communication device that is not being viewed since the fingerprint scanner may be at an upper portion of the device housing while upside down.

Figure 13A:
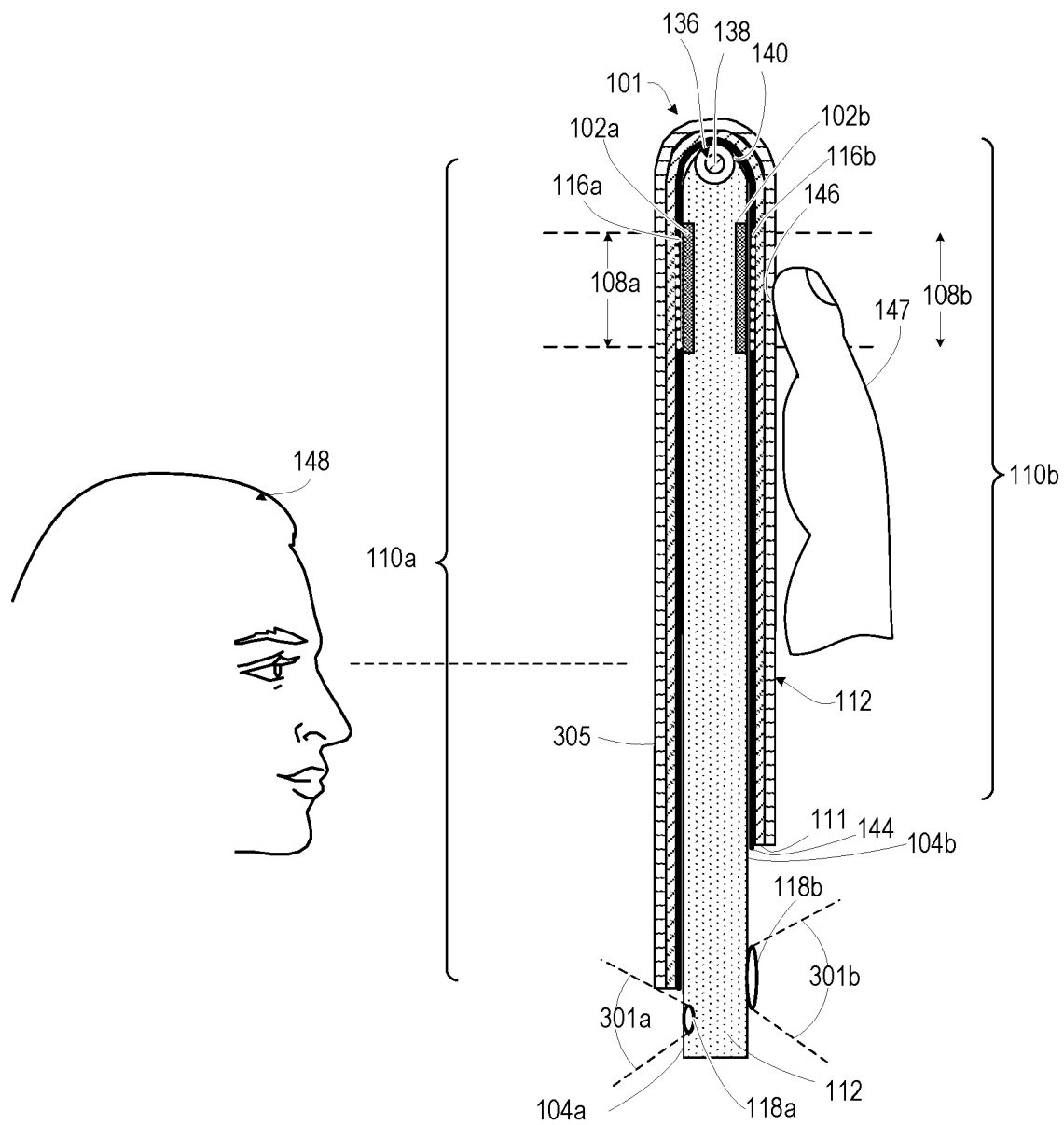
FIG. 13A depicts a left side view of the communication device of FIG. 1 while the blade assembly is retracted and gripped upside down from the back side and viewed from the front side by the user, according to one or more embodiments.
Figure 13B:
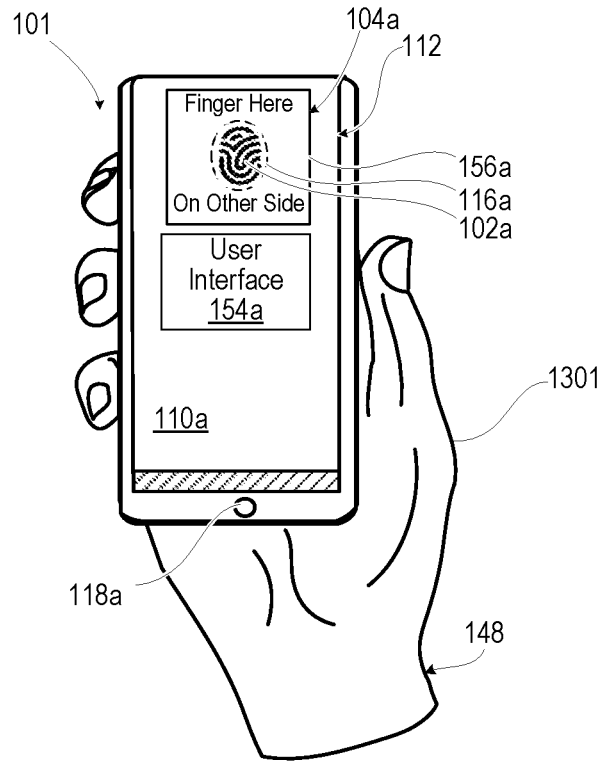
FIG. 13B depicts a front view of the communication device of FIG. 13A, according to one or more embodiments.
Figure 13C:
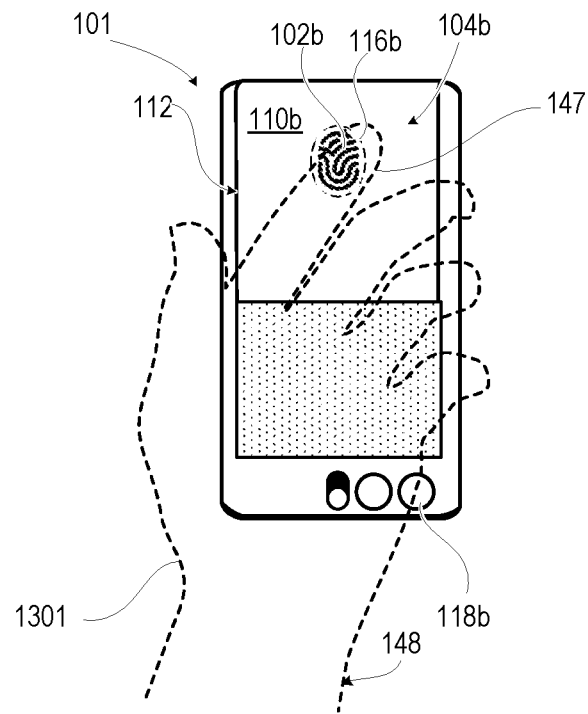
FIG. 13C depicts a back view of the communication device of FIG. 13A, according to one or more embodiments.

FIGS. 13A, 13B, and 13C respectively depict a left side view, a front view, and a back view of communication device 101 while blade assembly 112 is retracted. Communication device 101 is gripped upside down by hand 1301 of user 148 from back side 104*b* and viewed from front side 104*a* by user 148. With reference to FIG. 13A, user 148 is on front side 104*a* of communication device 101 viewing front display 110*a*. User 148 is visible in front FOV 301*a* of front image capturing device 118*a*. User 148 is not visible in back FOV 301*b* of back image capturing device 118*b*. User 148 is positioning finger 147 at second FOD area 116*b* of blade assembly 112, which is aligned with back fingerprint scanner 102*b* at back FOD location 108*b* of device housing 106. Roller 140 of translation mechanism 136 is engaged to an underside of blade substrate 144 at bottom edge 142, which is now oriented at the top. With reference to FIG. 13C, right hand 1301 of user 148 is gripping back side 104*b* of communication device 101, aligning finger 146 with second fingerprint scanner 102*b*, which is upside down. With reference to FIG. 13A, controller 120 of communication device 101 rotates presentation of front visual indication 156*a* and front user interface 154*a* to be correctly viewable while in the upside down orientation. In one or more embodiments, front visual indication 156*a* is proximate to back fingerprint scanner 102*b* that is triggered to initiate scanning. Although front visual indication 156*a* is presented on front display 110*a*, content ("finger here on other side") of front visual indication 156*a* can indicate reference to a position of back fingerprint scanner 102*b* on back side 104*b* (FIG. 13C). For example, front visual indication 156*a* can prompt user 148 to present finger 147 for fingerprint 146 to back fingerprint scanner 102*b* opposite to front display 110*a* being viewed by user 148.

Figure 14A:
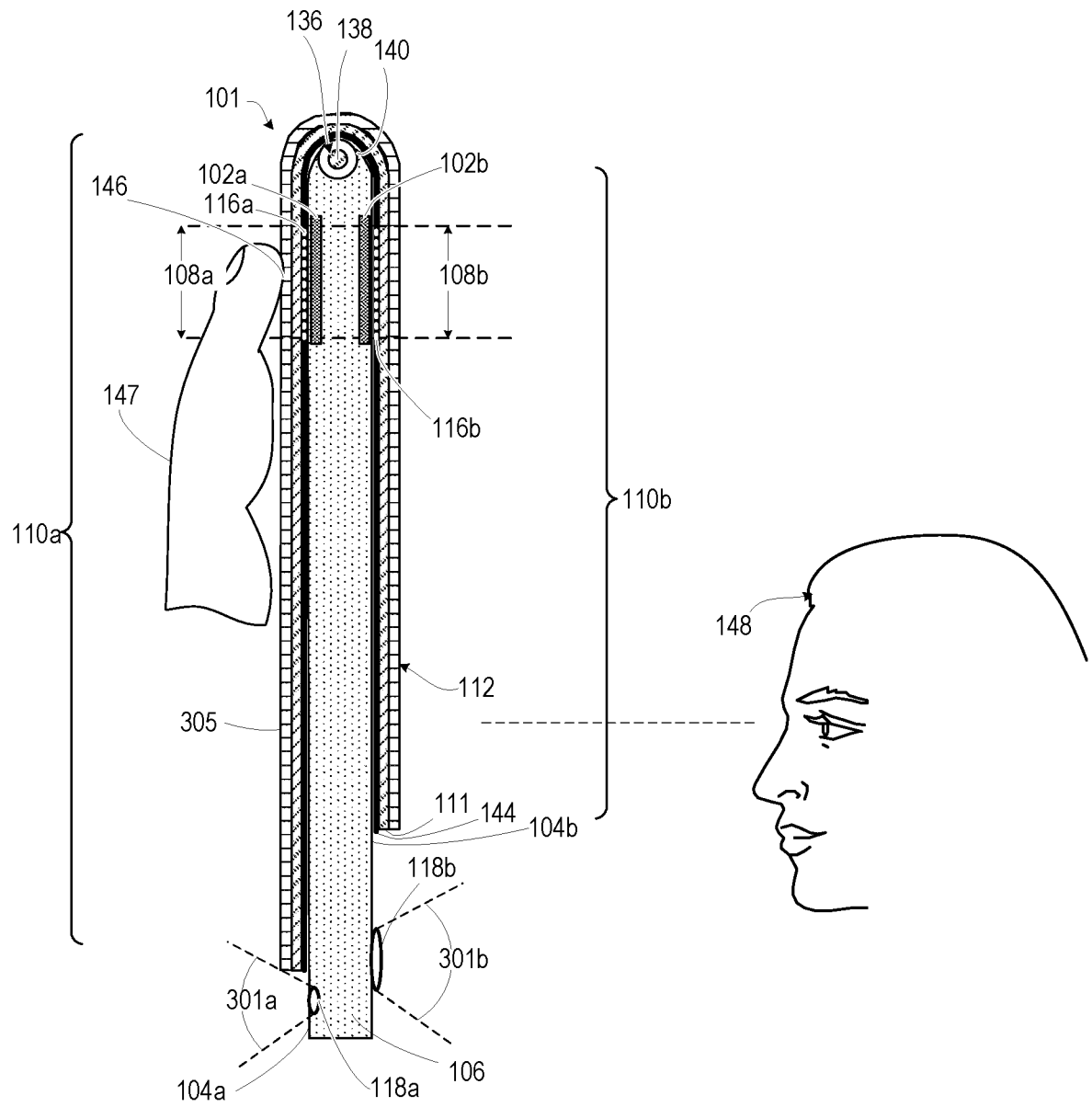
FIG. 14A depicts a left side view of the communication device of FIG. 1 while the blade assembly is retracted and gripped upside down from the front side and viewed from the back side by the user, according to one or more embodiments.
Figure 14B:
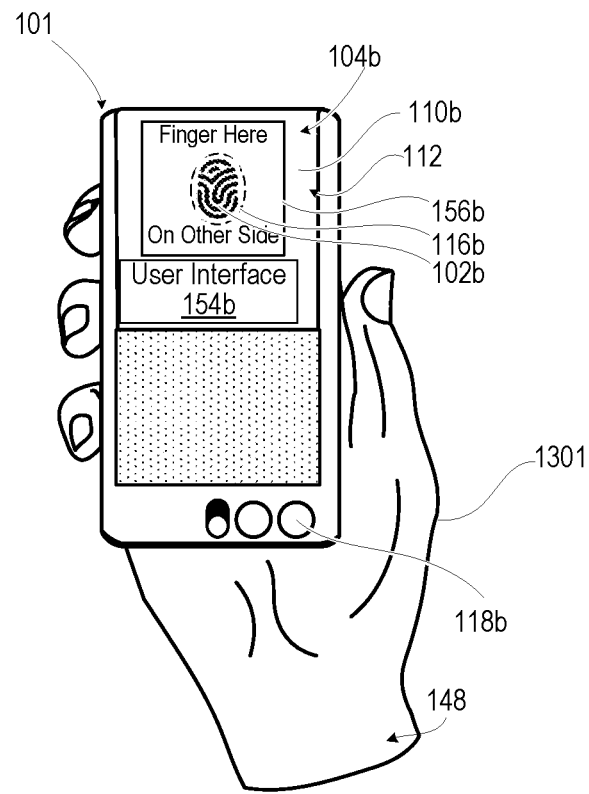
FIG. 14B depicts a back view of the communication device of FIG. 14A, according to one or more embodiments.
Figure 14C:
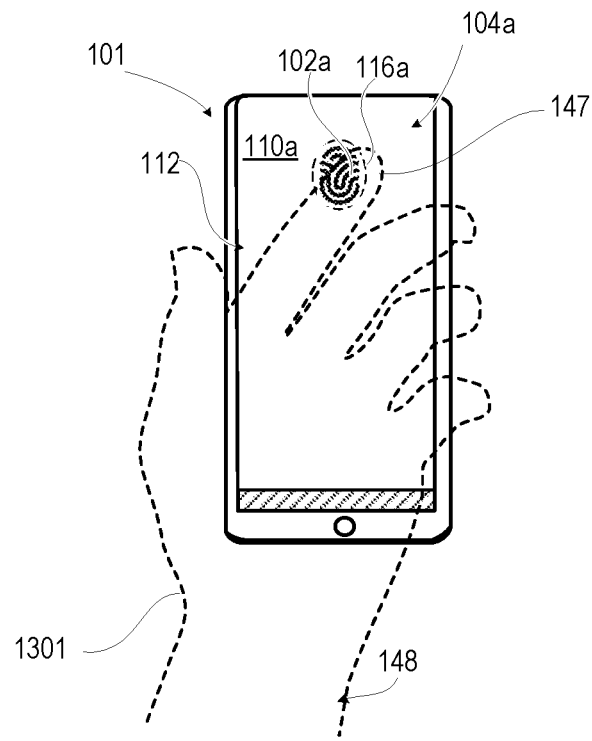
FIG. 14C depicts a front view of the communication device of FIG. 14A, according to one or more embodiments.

FIGS. 14A, 14B, and 14C depict respectively a left side view, a front view, and a back view of communication device 101 while blade assembly 112 is retracted. Communication device 101 is gripped upside down by right hand 1301 of user 148 from front side 104*a* and viewed from back side 104*b* by user 148. With reference to FIG. 14A, user 148 is on back side 104*b* of communication device 101 viewing back display 110*b*. User 148 is visible in back FOV 301*b* of back image capturing device 118*b*. User 148 is not visible in front FOV 301*a* of front image capturing device 118*a*. User 148 is positioning finger 147 at first FOD area 116*a* of blade assembly 112, which is aligned with front fingerprint scanner 102*a* at front FOD location 108*a* of device housing 106. Roller 140 of translation mechanism 136 is engaged to an underside of blade substrate 144 at bottom edge 142, which is now oriented at the top. With reference to FIG. 14C, right hand 1301 of user 148 is gripping front side 104*a* of communication device 101, aligning finger 146 with first fingerprint scanner 102*a*, which is upside down. With reference to FIG. 14A, communication device 101 rotates presentation of back visual indication 156*b* and back user interface 154*b* to be correctly viewable while in the upside down orientation. In one or more embodiments, back visual indication 156*b* is proximate to front fingerprint scanner 102*a* that is triggered to initiate scanning. Although back visual indication 156*b* is presented on back display 110*b*, content ("finger here on other side") of back visual indication 156*b* can indicate reference to a position of front fingerprint scanner 102a on front side 104a (FIG. 14C). Back visual indication 156b prompts user 148 to present finger 147 for fingerprint 146 to front fingerprint scanner 102a opposite to back display 110b being viewed by user 148.

In one or more embodiments, with continued reference to FIG. 1, controller 120 determines, based on input from the at least one sensor such as orientation sensor 134 or front and back image capturing devices 118a-118b, whether communication device 101 is in an upside-down orientation. In response to determining that a requirement exists for scanning fingerprint 146 of user 148 while communication device 101 is in the upside-down orientation, controller 120 triggers at least one of the front and the back fingerprint scanners 102a-102b to initiate scanning. Controller 120 receives a fingerprint image from a corresponding one of front and back fingerprint scanner 102a-102b. Controller 120 authenticates user 148 in response to identifying that an upside-down version of the received fingerprint image corresponds to fingerprint 146 of an authorized user, based on authentication data 150.

In one or more embodiments, in response to determining that a requirement exists for scanning fingerprint 146 of user 148, controller 120 triggers: (i) at least one of front and back fingerprint scanners 102a-102b to initiate scanning while blade assembly 112 is in the fully retracted position; and (ii) only front fingerprint scanner 102a to initiate scanning while in the fully extended position that aligns second FOD area 116b above front fingerprint scanner 102a. Controller 120 obtains biometric feature data from fingerprint 146. Controller 120 authenticates fingerprint 146 by matching one of upright and upside-down versions of the biometric feature data for fingerprint 146 with either an upright or an upside-down version of authentication data 150 stored in memory subsystem 126.

In one or more embodiments, controller 120 triggers front and back image capturing devices 118a-118b to capture a respective front preview image of front FOV 301 aand back preview image of back FOV 301b (FIGS. 13A and 14A). Controller 120 determines by evaluating the front preview image and the back preview image whether user 148 is identified as facing one of front side 104a and back side 104b of communication device 101. Controller 120 triggers front fingerprint scanner 102a in response to identifying that controller 120 is right-side up and user 148 is facing front side 104a. Controller 120 triggers front fingerprint scanner 102a in response to identifying that communication device 101 is upside down and user 148 is facing back side 104b. Controller 120 triggers back fingerprint scanner 102b in response to identifying that communication device 101 is right-side up and user 148 is facing back side 104b. Controller 120 triggers back fingerprint scanner 102b in response to identifying that communication device 101 is upside down and user 148 is facing front side 104a. In one or more particular embodiments, controller 120 enables first function 152a presented via front display 110a in response to authenticating fingerprint 146 while user 148 is facing front side 104a. Controller 120 enables second function 152b presented via back display 110b in response to authenticating fingerprint 146 while user 148 is facing back side 104b.

Figure 15:
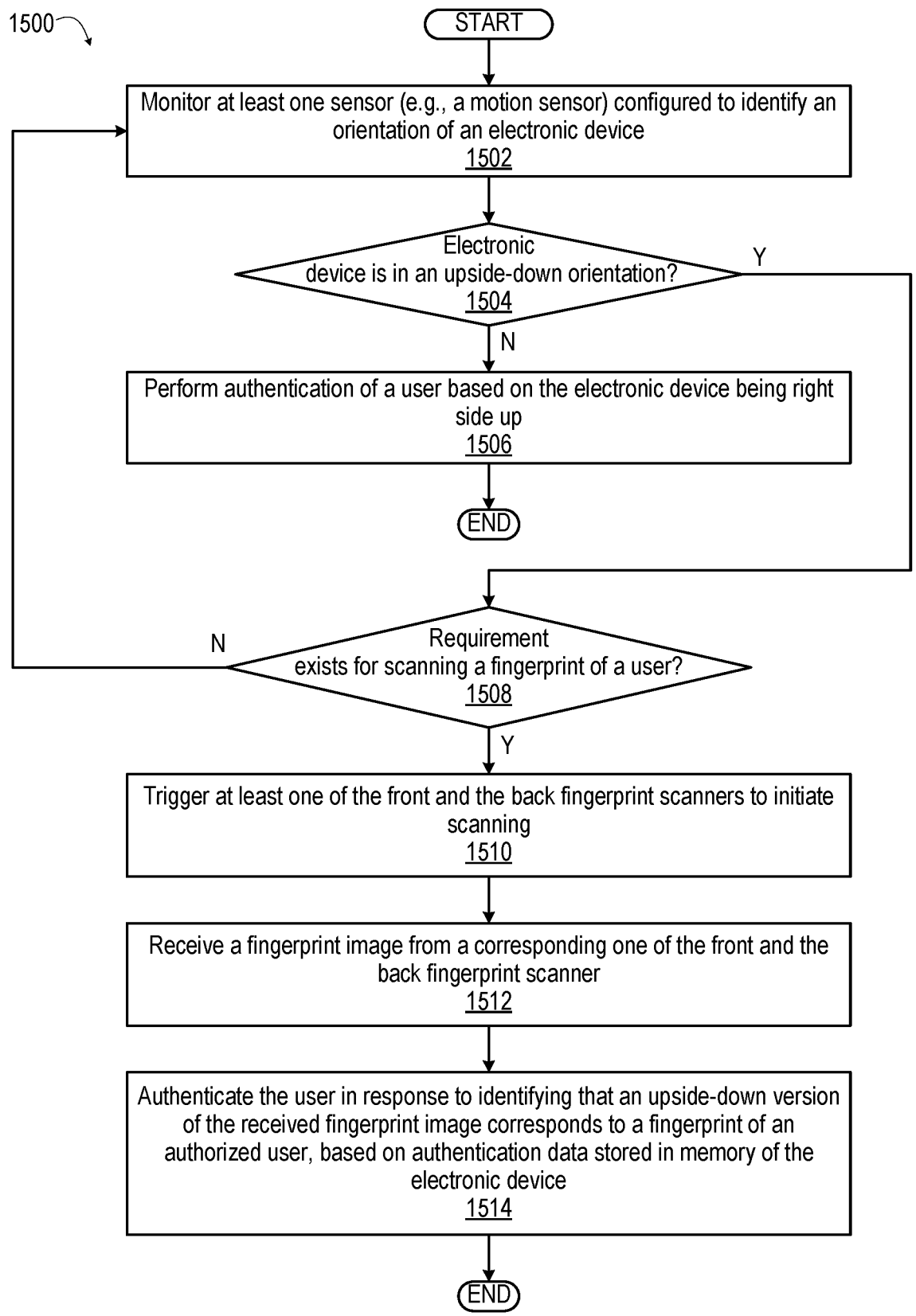
FIG. 15 is a flow diagram presenting a method of authenticating a user holding an electronic device in an upside-down orientation, where the device has front and back imaging capturing devices, front and back displays, and front and back fingerprint scanners, according to one or more embodiments.
Figure 16A:
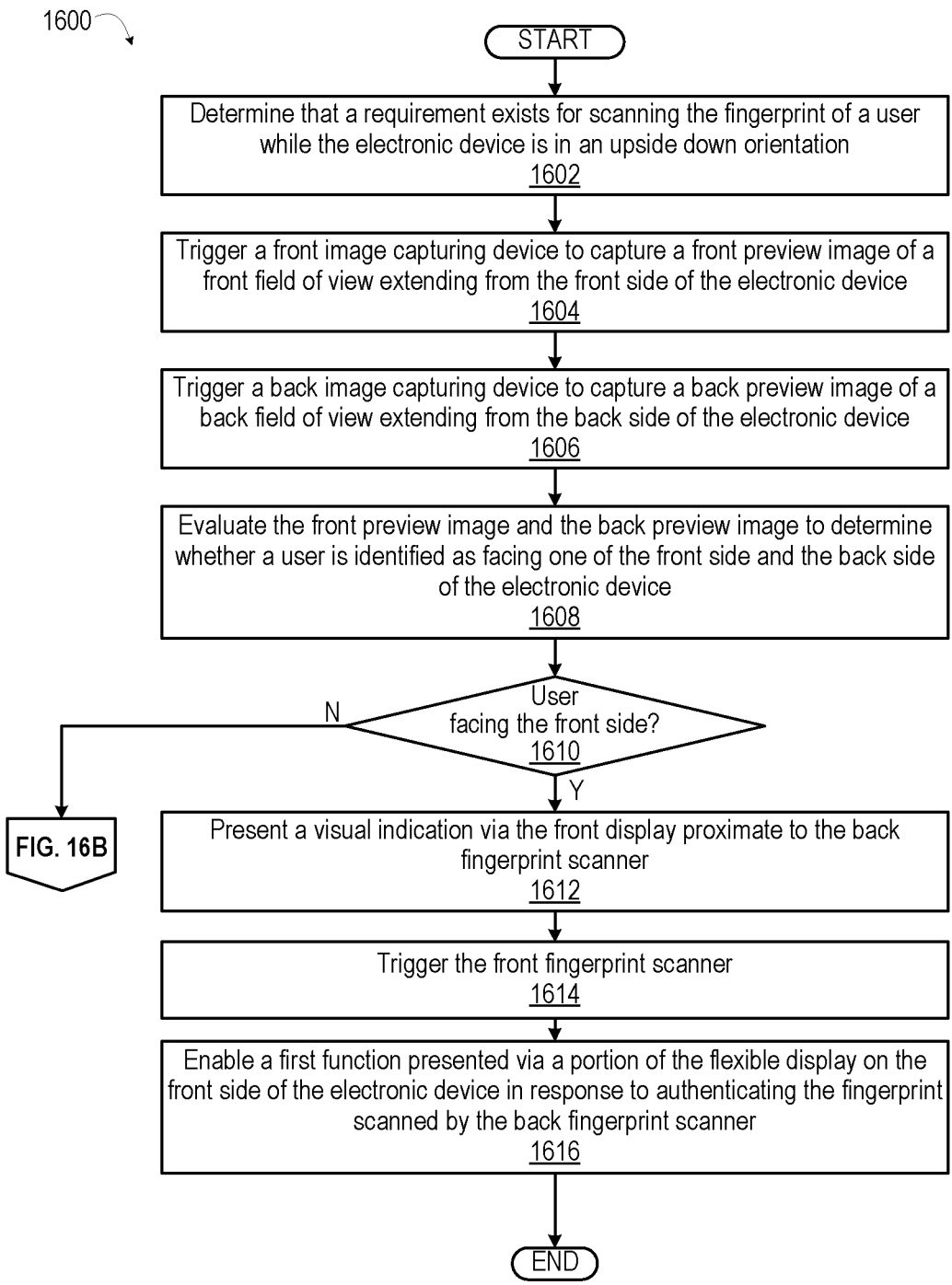
FIGS. 16A-16B (collectively "FIG. 16") are a flow diagram of a method of selecting one of the front and back fingerprint scanners on the electronic device being held in the upside-down orientation based on detecting the user viewing one of the front and the back side, according to one or more embodiments.
Figure 16B:
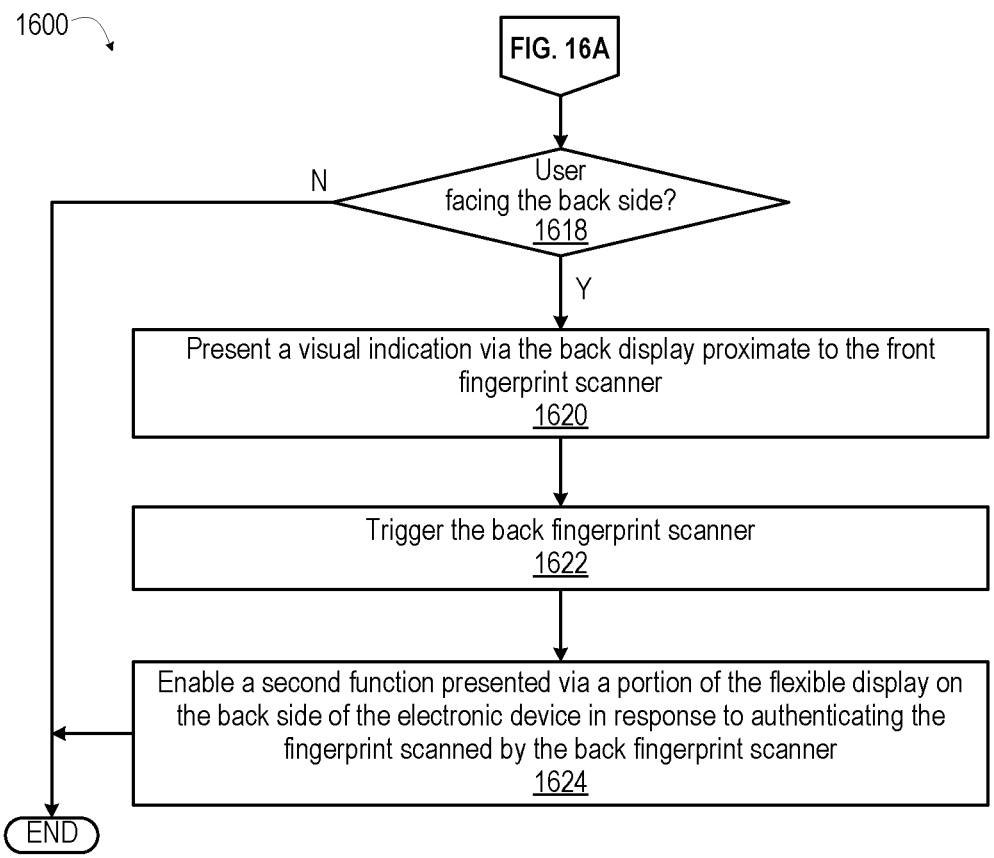
Figure 17A:
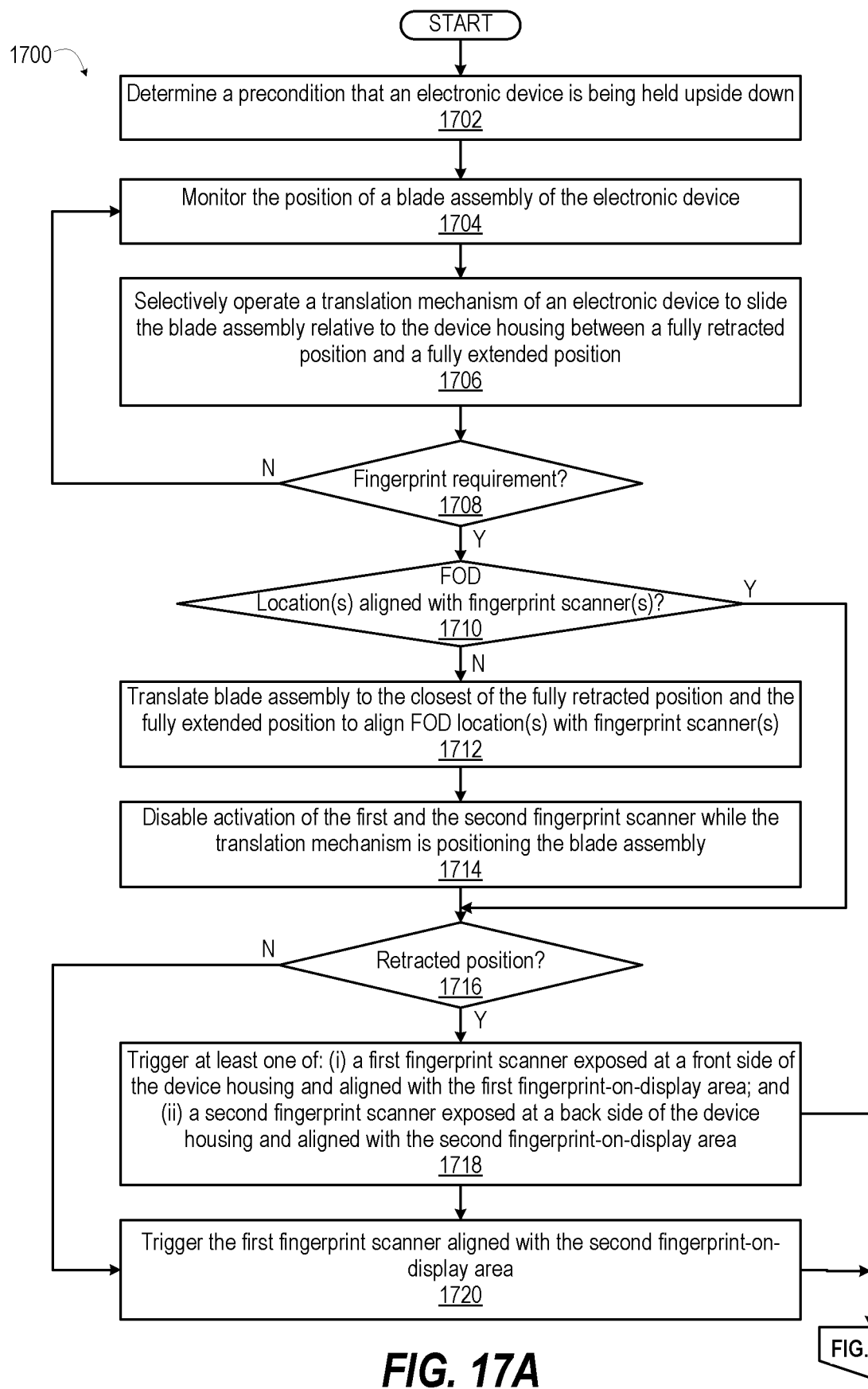
FIGS. 17A-17B (collectively "FIG. 17") are a flow diagram presenting a method of authenticating a user of the electronic device held upside down and having a blade assembly that provides finger-on-display locations that align with front and back fingerprint scanner.
Figure 17B:
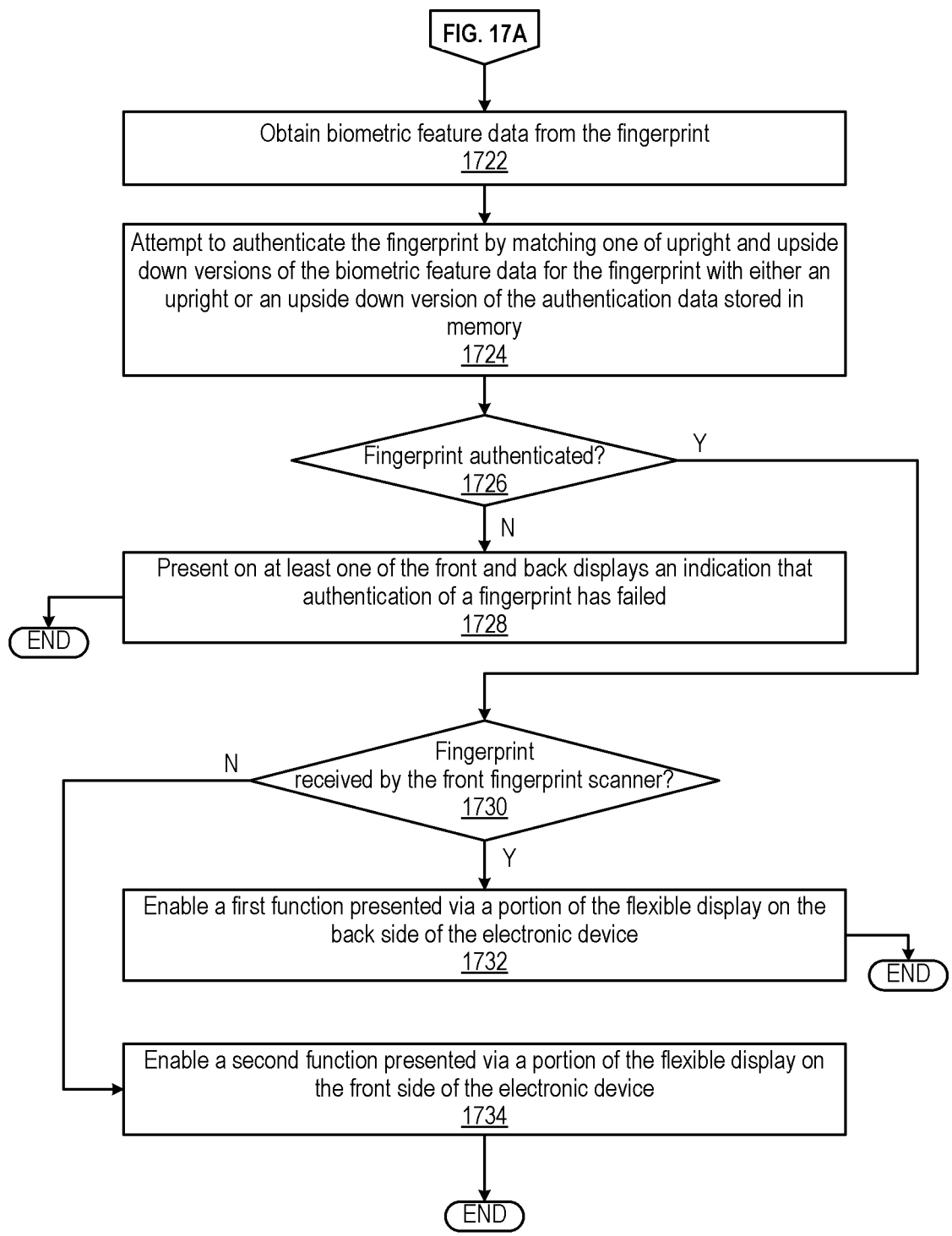

FIG. 15 is a flow diagram presenting a method of authenticating a user holding an electronic device in an upside down orientation, where the device that has front and back imaging capturing devices, front and back displays, and front and back fingerprint scanners. FIGS. 16A-16B (collectively "FIG. 16") are a flow diagram of a method of selecting one of the front and back fingerprint scanners on the electronic device in the upside-down orientation based on detecting the user viewing one of the front and the back side. FIG. 17A-17B (collectively "FIG. 17") is a flow diagram presenting method 1700 of authenticating a user of the electronic device held upside down and having a blade assembly that provides finger-on-display locations that align with front and back fingerprint scanner. Features of method 1600 (FIG. 16) and method 1700 (FIG. 17) may augment features of method 1500 (FIG. 15). The descriptions of method 1500 (FIG. 15), method 1600 (FIG. 16), and method 1700 (FIG. 17) are provided with general reference to the specific components illustrated within the preceding FIGS. 1, 2, 3A-3C, 4-10, 13A-13B, and 14A-14B. Specific components referenced in method 1500 (FIG. 15), method 1600 (FIG. 16) and method 1700 (FIG. 17) may be identical or similar to components of the same name used in describing preceding FIGS. 1, 2, 3A-3C, 4-10, 13A-13B, and 14A-14B. In one or more embodiments, controller 120 (FIGS. 1-2) configures communication device 101 (FIGS. 1-2) to provide the described functionality of method 1500 (FIG. 15), method 1600 (FIG. 16) and method 1700 (FIG. 17).

With reference to FIG. 15, method 1500 includes monitoring at least one sensor (e.g., orientation sensor) configured to identify an orientation of an electronic device (block 1502). The electronic device includes: (i) a device housing having a top edge, a bottom edge, and a front side and a back side extending vertically between the top edge and the back edge when the device is held in an upright orientation; (ii) a front fingerprint scanner exposed at the front side of the device housing at a front fingerprint scanner location that is in a lower portion of the front side when the electronic device is an upright position; (iii) a back fingerprint scanner exposed at the back side of the device housing at a back fingerprint scanner location that is in a lower portion of the back side when the electronic device is the upright position; (iv) a front display presented on the front side of the device housing; and (v) a back display presented on the back side of the device housing. Method 1500 includes determining, based on input from at least one sensor, whether the electronic device is in an upside-down orientation (decision block 1504). In response to determining that the electronic device is not upside down, method 1500 includes performing fingerprint-based authentication of a user based on the electronic device being right side up (i.e., in the upright configuration) (block 1506). In an example, aspects of method 1100 (FIG. 11) and method 1200 (FIG. 12) may be performed. Then method 1500 ends.

In response to determining that the electronic device is upside down, method 1500 includes determining whether a requirement exists for scanning a fingerprint of a user (decision block 1508). In response to determining that a requirement does not exist for scanning a fingerprint of a user while the electronic device is in the upside down orientation, method 1500 returns to block 1502. In response to determining that a requirement exists for scanning a fingerprint of a user while the electronic device is in the upside-down orientation, method 1500 includes triggering at least one of the front and the back fingerprint scanners to initiate scanning (block 1510). Method 1500 includes receiving a fingerprint image from a corresponding one of the front and the back fingerprint scanner (block 1512). Method 1500 includes authenticating the user in response to identifying that an upside-down version of the received fingerprint image corresponds to a fingerprint of an authorized user, based on authentication data stored in memory of the electronic device (block 1514). An implementation of authenticating the fingerprint is provided below with regard to method 1700 of FIG. 17. Then method 1500 ends.

With reference to FIG. 16A, as a precondition, method 1600 includes determining that a requirement exists for scanning the fingerprint of a user while the electronic device is in an upside-down orientation (block 1602). Method 1600 includes triggering a front image capturing device to capture a front preview image of a front field of view extending from the front side of the electronic device (block 1604). Method 1600 includes triggering a back image capturing device to capture a back preview image of a back field of view extending from the back side of the electronic device (block 1606). Method 1600 includes evaluating the front preview image and the back preview image to determining whether a user is identified as facing one of the front side and the back side of the electronic device (block 1608). Method 1600 includes determining whether the user is facing the front side (decision block 1610). In response to determining that the user is facing the front side, in one or more embodiments, method 1600 includes presenting a visual indication via the front display proximate to the back fingerprint scanner (block 1612). In an example, the hand that is holding the electronic device presents a finger to the fingerprint scanner as depicted in FIGS. 13C and 14C. The visual indication prompts the user to present a fingerprint to the back fingerprint scanner opposite to the front display being viewed by the user. Method 1600 includes triggering the front fingerprint scanner (block 1614). Method 1600 includes enabling a first function presented via the front display on the front side of the electronic device in response to authenticating the fingerprint scanned by the back fingerprint scanner (block 1616). Then method 1600 ends.

In response to determining in decision block 1610 that the user is not facing the front side, method 1600 includes determining whether the user is facing the back side (decision block 1618). In response to determining that the user is facing the back side, in one or more embodiments, method 1600 includes presenting a visual indication via the back display proximate to the front fingerprint scanner (block 1620). The visual indication prompts the user to present a fingerprint to the front fingerprint scanner opposite to the back display being viewed by the user. Method 1600 includes triggering the back fingerprint scanner (block 1622). Method 1600 includes enabling a second function presented via a portion of the flexible display on the back side of the electronic device in response to authenticating the fingerprint scanned by the front fingerprint scanner (block 1624). Then method 1600 ends. In response to determining that the user is not facing the back side in decision block 1618, method 1600 ends. If unable to select one of the two fingerprint scanners based on detecting the user in an image of the user in method 1600, authentication of the user may be accomplished as previously described for method 1500 (FIG. 15) by selecting both fingerprint scanners without depending on an image of the user.

With reference to FIG. 17A, method 1700 includes determining a precondition that an electronic device is being held upside down (block 1702). Method 1700 includes monitoring the position of a blade assembly of an electronic device (block 1704). The blade assembly has a blade slidably coupled to the device housing and has a flexible display attached to the blade. The blade assembly has first and second fingerprint-on-display (FOD) areas that are optically transmissive, enabling light to pass through the blade assembly. Method 1700 includes selectively operating a translation mechanism of the electronic device to slide the blade assembly relative to a device housing between a fully retracted position and a fully extended position (block 1706). Method 1700 includes determining whether a requirement exists for scanning a fingerprint of a user (decision block 1708). In response to determining that a requirement does not exist for scanning a fingerprint of a user, method 1700 returns to block 1702. In response to determining that a requirement exists for scanning a fingerprint of a user, method 1700 includes determining whether the blade assembly is in one of the fully retracted position or the fully extended position that aligns at least one of the FOD areas aligned with a corresponding one of the front and the back fingerprint scanners (decision block 1710). In response to determining that neither of the FOD areas is aligned with a corresponding one of the front and the back fingerprint scanners, method 1700 includes translating the blade assembly to the closest of the fully retracted position and the fully extended position to align at least one of the FOD location(s) with fingerprint scanner(s) (block 1712). Method 1700 includes disabling activation of the first and the back fingerprint scanner while the translation mechanism is positioning the blade assembly (block 1714). In response to determining that at least one of the FOD areas is aligned with a corresponding one of the front or the back fingerprint scanners in decision block 1710 or after block 1714, method 1700 includes determining whether the blade assembly is in the fully retracted position (decision block 1716). In response to determining that the blade assembly is in the fully retracted position, method 1700 includes triggering activation of at least one of: (i) a front fingerprint scanner exposed at a front side of the device housing and aligned with the first FOD area; and (ii) a back fingerprint scanner exposed at a back side of the device housing and aligned with the second FOD areas (block 1718). In one or more embodiments, method 1700 includes triggering activation of both the front and the back fingerprint scanners. Then method 1700 proceeds to block 1722 of FIG. 17B. In response to determining that the blade assembly is not in the fully retracted position in decision block 1710, and is thus in a fully extended position, method 1700 includes triggering activation of only the front fingerprint scanner that is aligned with the second FOD area of the blade assembly (block 1720). Then method 1700 proceeds to block 1722 of FIG. 17B.

With reference to FIG. 17B, after either block 1716 or 1718 (FIG. 17A), method 1700 includes obtaining biometric feature data from the fingerprint (block 1722). Method 1700 includes attempting to authenticate the fingerprint by matching one of upright and upside-down versions of the biometric feature data for the fingerprint with either an upright or an upside-down version of the authentication data stored in memory (block 1724). Method 1700 includes determining whether the fingerprint is authenticated (decision block 1726). In response to determining that the fingerprint is not authenticated, method 1700 includes presenting on at least one of the front and back displays an indication that authentication of a fingerprint has failed (block 1728). Then method 1700 ends. In response to determining that the fingerprint is authenticated in decision block 1726, method 1700 includes determining whether the fingerprint was received by the front fingerprint scanner (decision block 1730).

In response to determining the fingerprint was received by the front fingerprint scanner, method 1700 includes enabling a first function presented via a portion of the flexible display on the back side of the electronic device (block 1732). Then method 1700 ends. In response to determining the fingerprint was not received by the front fingerprint scanner (i.e., the fingerprint was received by the back fingerprint scanner) in decision block 1730, method 1700 includes enabling a second function presented via a portion of the flexible display on the front side of the electronic device (block 1734). Then method 1700 ends. First and second functions may be the same or different. In an example, the functions are customized for respective sizes of the front and back displays.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
    a device housing having a front side and a back side;
    a front fingerprint scanner exposed at the front side of the device housing at a front fingerprint scanner location;
    a back fingerprint scanner exposed at the back side of the device housing;
    a blade assembly having a blade slidably coupled to the device housing and having a flexible display attached to the blade, the blade assembly having first and second fingerprint-on-display areas that are optically transmissive, enabling light from corresponding ones of the front and the back fingerprint scanner to pass through the blade assembly; and
    a translation mechanism operable to slide the blade assembly relative to the device housing between a fully retracted position and a fully extended position, wherein in the fully retracted position the first and the second fingerprint-on-display areas are respectively positioned above the front fingerprint scanner and the back fingerprint scanner.

2. The electronic device of claim 1, wherein the back fingerprint scanner is aligned with the front fingerprint scanner for consistent fingerprint-on-display locations as viewed from either the front side or the back side of the electronic device.

3. The electronic device of claim 1, wherein the blade of the blade assembly comprises sheet metal and the front and the back fingerprint-on-display areas comprise a respective hole in the sheet metal.

4. The electronic device of claim 1, wherein the blade of the blade assembly comprises an opaque sheet metal and the front and the back fingerprint-on-display areas comprise a respective transmissive area of the blade surrounded by opaque sheet material.

5. The electronic device of claim 1, further comprising:
    a controller communicatively coupled to the first and the back fingerprint scanners, the blade assembly and the translation mechanism, and which:
        selectively activates the translation mechanism to position the blade assembly to a selected one of the fully retracted position and the fully extended position that aligns the second fingerprint-on-display area above the front fingerprint scanner; and
        disables activation of the first and the back fingerprint scanner while the translation mechanism is positioning the blade assembly.

6. The electronic device of claim 5, wherein the controller:
    selectively activates the translation mechanism to position the blade assembly to a selected one of the fully retracted position, the fully extended position that aligns the second fingerprint-on-display area above the front fingerprint scanner, and at least one intermediate position between the fully retracted position and the fully extended position; and
    in response to determining that the blade assembly is in one of the at least one intermediate positions, selectively activates the translation mechanism to position the blade assembly in one of the fully retracted and the fully extended positions in response to determining a requirement exists to capture a fingerprint of a user.

7. The electronic device of claim 1, further comprising a controller communicatively coupled to the first and the back fingerprint scanners, and which:
in response to determining that a requirement exists for scanning a fingerprint of a user while the blade assembly is in the fully retracted position, triggers at least one of the first and the back fingerprint scanners to initiate scanning.

8. The electronic device of claim 7, wherein the controller:
in response to determining that the requirement exists for scanning a fingerprint of a user while the blade assembly is in the fully extended position that aligns the second fingerprint-on-display area above the front fingerprint scanner, triggers only the front fingerprint scanner to initiate scanning.

9. The electronic device of claim 1, further comprising:
a memory stores authentication data comprising biometric features data of at least one of upright and upside-down fingerprints of an authorized user of the electronic device; and
a controller communicatively coupled to the memory, and which:
in response to determining that a requirement exists for scanning a fingerprint of a user, triggers: (i) at least one of the front and the back fingerprint scanners to initiate scanning while in the fully retracted position; and (ii) only the front fingerprint scanner to initiate scanning while in the fully extended position that aligns the second fingerprint-on-display area above the front fingerprint scanner;
obtains biometric feature data from the fingerprint; and
authenticates the fingerprint by matching one of upright and upside down versions of the biometric feature data for the fingerprint with either an upright or an upside down version of the authentication data stored in memory.

10. The electronic device of claim 1, further comprising:
a front image capturing device having a front field of view extending from the front side of the electronic device;
a back image capturing device having a back field of view extending from the back side of the electronic device; and
a controller communicatively coupled to the first and the back fingerprint scanners, the blade assembly, the translation mechanism, and the front and the back image capturing devices, and which:
in response to determining that a requirement exists for scanning the fingerprint of a user while the blade assembly is in the fully retracted position:
triggers the front and the back image capturing devices to capture a respective front preview image of the front field of view and back preview image of the back field of view;
determines by evaluating the front preview image and the back preview image whether a user is identified as facing one of the front side and the back side of the electronic device;
triggers the front fingerprint scanner in response to identifying the user as facing the front side; and
triggers the back fingerprint scanner in response to identifying the user as facing the back side.

11. The electronic device of claim 10, wherein the controller:
enables a first function presented via a portion of the flexible display on the front side of the electronic device in response to authenticating the fingerprint scanned by the front fingerprint scanner; and
enables a second function presented via a portion of the flexible display on the back side of the electronic device in response to authenticating the fingerprint scanned by the back fingerprint scanner.

12. The electronic device of claim 1, further comprising:
a memory that stores user authentication data; and
a controller communicatively coupled to the first and the back fingerprint scanners, the blade assembly, the translation mechanism, and the memory, and which:
presents a visual indication via the flexible display proximate to a corresponding one of the first and the back fingerprint scanner that is triggered to initiate scanning, the visual indication prompting the user to present a fingerprint to the corresponding first or back fingerprint scanner;
receives a fingerprint image from the corresponding one of the first and the back fingerprint scanner; and
authenticates the user in response to identifying that the received fingerprint image corresponds to that of an authorized user based on the authentication data.

13. A method comprising:
selectively operating a translation mechanism of an electronic device to slide a blade assembly relative to a device housing between a fully retracted position and a fully extended position, the blade assembly having a blade slidably coupled to the device housing and having a flexible display attached to the blade, the blade assembly having first and second fingerprint-on-display areas that are optically transmissive, enabling light to pass through the blade assembly;
in response to determining that a requirement exists for scanning a fingerprint of a user while in the fully retracted position, triggering at least one of: (i) a front fingerprint scanner and (ii) a back fingerprint scanner; wherein the front fingerprint scanner is exposed at a front side of the device housing and aligned with the first fingerprint-on-display area, and the back fingerprint scanner is exposed at a back side of the device housing and aligned with the second fingerprint-on-display area; and
in response to determining that a requirement exists for scanning a fingerprint of a user while in the fully extended position, triggering the front fingerprint scanner aligned with the second fingerprint-on-display area.

14. The method of claim 13, further comprising:
selectively activating the translation mechanism to position the blade assembly to a selected one of the fully retracted position and the fully extended position that aligns the second fingerprint-on-display area above the front fingerprint scanner; and
disabling activation of the first and the back fingerprint scanner while the translation mechanism is positioning the blade assembly.

15. The method of claim 13, further comprising:
selectively activating the translation mechanism to position the blade assembly to a selected one of the fully retracted position, the fully extended position that aligns the second fingerprint-on-display area above the front fingerprint scanner, and at least one intermediate position between the fully retracted position and the fully extended position;
in response to determining that the blade assembly is in one of the at least one intermediate positions, selectively activating the translation mechanism to position the blade assembly in one of the fully retracted and the fully extended positions in response to determining a requirement exists to capture a fingerprint of a user; and disabling activation of the first and the back fingerprint scanner while the translation mechanism is positioning the blade assembly.

16. The method of claim 13, further comprising:

in response to determining that a requirement exists for scanning a fingerprint of a user while the blade assembly is in the fully retracted position, triggering at least one of the first and the back fingerprint scanners to initiate scanning; and in response to determining that the requirement exists for scanning a fingerprint of a user while the blade assembly is in the fully extended position that aligns the second fingerprint-on-display area above the front fingerprint scanner, triggering only the front fingerprint scanner to initiate scanning.

17. The method of claim 13, further comprising:

in response to determining that the requirement exists for scanning a fingerprint of a user, triggering: (i) at least one of the front and the back fingerprint scanners to initiate scanning while in the fully retracted position; and (ii) only the front fingerprint scanner to initiate scanning while in the fully extended position that aligns the second fingerprint-on-display area above the front fingerprint scanner;

obtaining biometric feature data from the fingerprint; and authenticating the fingerprint by matching one of upright and upside down versions of the biometric feature data for the fingerprint with either an upright or an upside down version of the authentication data stored in memory.

18. The method of claim 13, further comprising:

in response to determining that a requirement exists for scanning the fingerprint of a user while the blade assembly is in the fully retracted position:

triggering a front image capturing device to capture a front preview image of a front field of view extending from the front side of the electronic device;

triggering a back image capturing device to capture a back preview image of a back field of view extending from the back side of the electronic device;

determining by evaluating the front preview image and the back preview image whether a user is identified as facing one of the front side and the back side of the electronic device;

triggering the front fingerprint scanner in response to identifying the user as facing the front side; and triggering the back fingerprint scanner in response to identifying the user as facing the back side.

19. The method of claim 18, further comprising:

enabling a first function presented via a portion of the flexible display on the front side of the electronic device in response to authenticating the fingerprint scanned by the back fingerprint scanner; and enabling a second function presented via a portion of the flexible display on the back side of the electronic device in response to authenticating the fingerprint scanned by the front fingerprint scanner.

20. A computer program product comprising:

a computer readable storage device; and program code on the computer readable storage device that when executed by a processor associated with an electronic device, the program code enables the electronic device to provide functionality of:

selectively operating a translation mechanism of the electronic device to slide a blade assembly relative to a device housing between a fully retracted position and a fully extended position, the blade assembly having a blade slidably coupled to the device housing and having a flexible display attached to the blade, the blade assembly having first and second fingerprint-on-display areas that are optically transmissive, enabling light to pass through the blade assembly;

in response to determining that a requirement exists for scanning a fingerprint of a user while in the fully retracted position, triggering at least one of: (i) a front fingerprint scanner and (ii) a back fingerprint scanner; wherein the front fingerprint scanner is exposed at a front side of the device housing and aligned with the first fingerprint-on-display area, and the back fingerprint scanner is exposed at a back side of the device housing and aligned with the second fingerprint-on-display area; and in response to determining that a requirement exists for scanning a fingerprint of a user while in the fully extended position, triggering the front fingerprint scanner aligned with the second fingerprint-on-display area.

* * * * *